US012637046B2

(12) United States Patent
Matsuyama

(10) Patent No.: US 12,637,046 B2
(45) Date of Patent: May 26, 2026

(54) BRAKE CONTROL SYSTEM AND BRAKE CONTROL METHOD

(71) Applicant: Mitsubishi Electric Corporation, Tokyo (JP)

(72) Inventor: Etsuji Matsuyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 473 days.

(21) Appl. No.: 18/247,469

(22) PCT Filed: Nov. 20, 2020

(86) PCT No.: PCT/JP2020/043415
§ 371 (c)(1),
(2) Date: Mar. 31, 2023

(87) PCT Pub. No.: WO2022/107318
PCT Pub. Date: May 27, 2022

(65) Prior Publication Data
US 2024/0010175 A1      Jan. 11, 2024

(51) Int. Cl.
B60T 8/172          (2006.01)
B60L 7/24           (2006.01)
(Continued)

(52) U.S. Cl.
CPC ................ B60T 8/172 (2013.01); B60L 7/24 (2013.01); B60L 15/2009 (2013.01);
(Continued)

(58) Field of Classification Search
CPC ........ B60T 8/172; B60T 8/1705; B60T 7/128; B60T 13/665; B60T 17/228; B60L 7/24; B60L 15/2009; B60L 2200/26
See application file for complete search history.

(56) References Cited

U.S. PATENT DOCUMENTS 5,775,367 A * 7/1998 Yamaguchi ........... B60T 13/665
137/487.5
8,914,214 B2 * 12/2014 Matsuyama .......... B60T 8/1705
701/19
(Continued)

FOREIGN PATENT DOCUMENTS

CN        114274931 A  *  4/2022
EP          1167142 A1 *  1/2002  .............. B60T 7/126
(Continued)

OTHER PUBLICATIONS

DE-10106374-A1 (Year: 2002).*
(Continued)

*Primary Examiner* — Thomas J Williams
(74) *Attorney, Agent, or Firm* — BUCHANAN, INGERSOLL & ROONEY PC

(57) ABSTRACT

A brake control system includes a target braking force calculator to calculate a target braking force for causing a vehicle to decelerate in accordance with a braking instruction containing a normal braking instruction or emergency braking instruction, and a target pressure calculator to calculate a target pressure, indicating a target value of pressure of fluid to be fed to a mechanical brake device for activating the mechanical brake device, based on the target braking force. The brake control system further includes a compensation controller to execute control for compensating for the gap between the actual braking force and the target braking force when the braking instruction contains an emergency braking instruction, and an outputter to compress fluid fed from a fluid source in accordance with the target pressure and feed the compressed fluid to the mechanical brake device.

20 Claims, 14 Drawing Sheets

(51) Int. Cl.

| | | |
|---|---|---|
| *B60L 15/20* | (2006.01) | |
| *B60T 7/12* | (2006.01) | |
| *B60T 8/17* | (2006.01) | |
| *B60T 13/66* | (2006.01) | |
| *B60T 17/22* | (2006.01) | |

(52) U.S. Cl.
   CPC ............ *B60T 7/128* (2013.01); *B60T 8/1705* (2013.01); *B60T 17/228* (2013.01); *B60L 2200/26* (2013.01); *B60T 13/665* (2013.01)

(56) References Cited

U.S. PATENT DOCUMENTS

| | | | | |
|---|---|---|---|---|
| 2009/0255329 | A1* | 10/2009 | Connell | ............... B61L 25/025 73/121 |
| 2018/0222461 | A1* | 8/2018 | Tione | ................... B60T 17/228 |
| 2024/0010175 | A1* | 1/2024 | Matsuyama | ............ B60T 8/172 |

FOREIGN PATENT DOCUMENTS

| | | | | | |
|---|---|---|---|---|---|
| EP | 2757008 | A1 | * | 7/2014 | ............ B60T 13/665 |
| GB | 2172355 | A | * | 9/1986 | ............. B60T 13/74 |
| JP | H08268244 | A | | 10/1996 | |
| JP | 2010154607 | A | | 7/2010 | |
| JP | 2013141338 | A | | 7/2013 | |
| JP | 2020111115 | A | | 7/2020 | |
| WO | WO-2012101757 | A1 | * | 8/2012 | ............... B60T 8/72 |
| WO | WO-2019025282 | A1 | * | 2/2019 | ............ B60T 17/228 |
| WO | 2020162429 | A1 | | 8/2020 | |

OTHER PUBLICATIONS

CN-114274931-A (Year: 2022).*

International Search Report (PCT/ISA/210) with English translation and Written Opinion (PCT/ISA/237) mailed on Dec. 22, 2020, by the Japan Patent Office as the International Searching Authority for International Application No. PCT/JP2020/043415.

* cited by examiner

Figure 4:
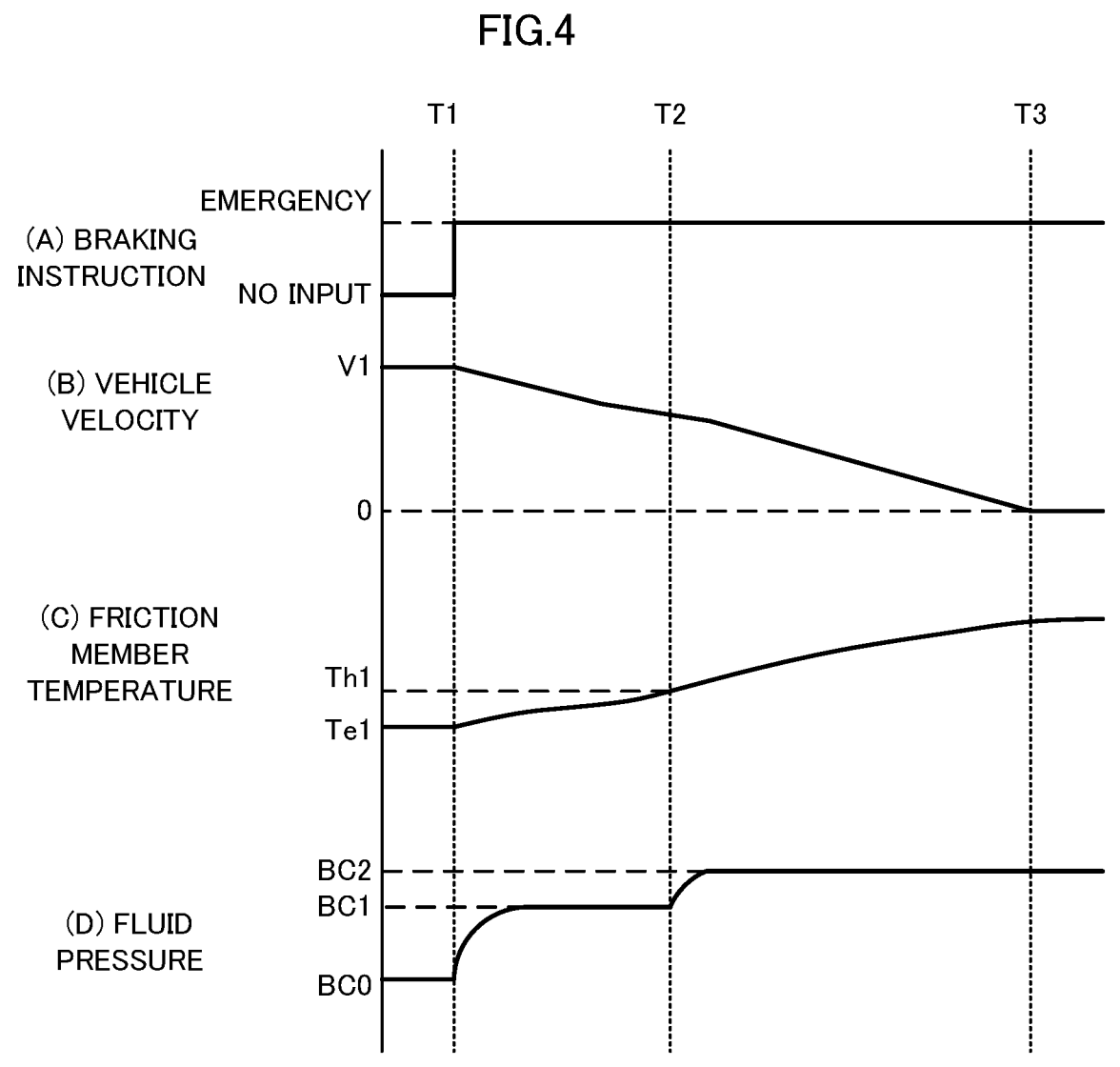

EMERGENCY (A) BRAKING
INSTRUCTION

NO INPUT (B) VEHICLE
VELOCITY

V1

0

(C) FRICTION
MEMBER
TEMPERATURE

Th1

Te1

(D) FLUID
PRESSURE

BC2
BC1

BC0

BRAKE CONTROL SYSTEM AND BRAKE CONTROL METHOD

TECHNICAL FIELD

The present disclosure relates to a brake control system and a method of controlling brake.

BACKGROUND ART

Railway vehicles include a motor that rotates in response to feeding of electric power from a power source or an electric generator, which is driven by an internal combustion engine to generate electric power. Such a railway vehicle accelerates by receiving a driving force from the motor and decelerates by receiving a mechanical braking force generated by a mechanical brake device. The mechanical brake device presses a friction member, which moves depending on the pressure of fluid fed from a brake control apparatus, against a rotating body, which rotates during running of the railway vehicle, and thereby generates a mechanical braking force.

Examples of braking instructions for the railway vehicle include normal braking instructions and emergency braking instructions. When the braking instruction contains an emergency braking instruction, that is, during emergency brake, the friction member is pressed against the rotating body more strongly than that when the braking instruction contains a normal braking instruction, that is, during normal brake. This operation generates a larger mechanical braking force during emergency brake than that during normal brake. A typical example of the brake control apparatus that can achieve the above-mentioned brake control is disclosed in Patent Literature 1.

CITATION LIST

Patent Literature

Patent Literature 1: Unexamined Japanese Patent Application Publication No. 2010-154607

SUMMARY OF INVENTION

Technical Problem

During normal brake, the brake control apparatus calculates a target braking force for achieving a normal deceleration, which is a target value of deceleration of a vehicle indicated by a normal braking instruction input in response to manipulation of a brake setter installed in a cab. The brake control apparatus then calculates a target pressure, which is a target value of pressure of fluid to be fed to a mechanical brake device, on the basis of the target braking force, and feeds the fluid compressed in accordance with the target pressure to the mechanical brake device. The fed fluid activates the mechanical brake device and thereby generates a mechanical braking force. The brake control apparatus executes feedback control of the target pressure on the basis of the pressure of fluid fed to the mechanical brake device, and thereby allows the actual braking force generated by the mechanical brake device to approach the target braking force.

In contrast, during emergency brake, the brake control apparatus feeds the mechanical brake device with the fluid compressed to another target pressure calculated on the basis of the target braking force for achieving an emergency deceleration, which is a target value of deceleration of the vehicle greater than the maximum value of the normal deceleration. The fed fluid activates the mechanical brake device and thereby generates a constant mechanical braking force. The continuous operation of the mechanical brake device leads to a rise in the temperature of the friction member. The rise in the temperature of the friction member unfortunately causes a reduction in the friction coefficient of the contact surface between a friction member and a rotating body. The actually generated mechanical braking force accordingly decreases despite of a constant force of pressing the friction member against the rotating body. Such a decrease in the actual braking force makes it difficult to stop the railway vehicle within a desired braking distance. The decrease in the actual braking force that results in a gap between the actual braking force and the target braking force can also be caused by factors other than a rise in the temperature of the friction member.

An objective of the present disclosure, which has been accomplished in view of the above situations, is to provide a brake control system and a method of controlling brake that can suppress a decrease in the actual braking force during emergency brake.

Solution to Problem

In order to achieve the above objective, a brake control system according to an aspect of the present disclosure includes a target braking force calculator, a target pressure calculator, an outputter, and a compensation controller. The target braking force calculator calculates a target braking force for causing a railway vehicle to decelerate in accordance with a braking instruction containing a normal braking instruction, for designating a normal deceleration indicating a target value of deceleration of the railway vehicle, or an emergency braking instruction, for designating an emergency deceleration indicating a target value of deceleration of the railway vehicle greater than a maximum value of the normal deceleration. The target pressure calculator calculates a target pressure, indicating a target value of pressure of fluid to be fed to a mechanical brake device in order to activate the mechanical brake device, based on the target braking force. The mechanical brake device presses a friction member that moves depending on a pressure of the fed fluid against a rotating body that rotates during running of the railway vehicle, and thereby causes the vehicle to decelerate. The outputter compresses fluid fed from a fluid source in accordance with the target pressure, and feeds the compressed fluid to the mechanical brake device. The compensation controller executes control for compensating for the gap between an actual braking force, indicating an existing braking force generated in the railway vehicle and the target braking force when the braking instruction contains an emergency braking instruction.

Advantageous Effects of Invention

The brake control system according to an aspect of the present disclosure executes control for compensating for the gap between the actual braking force, indicating the existing braking force generated in the vehicle and the target braking force when the braking instruction contains an emergency braking instruction, and can therefore suppress a decrease in the actual braking force during emergency brake.

BRIEF DESCRIPTION OF DRAWINGS

FIG. 4 is a timing chart illustrating exemplary operations of brake control executed by the brake control apparatus according to Embodiment 1, the section (A) illustrates a braking instruction, the section (B) illustrates a velocity of a vehicle, the section (C) illustrates a temperature of a friction member, and the section (D) illustrates a pressure of fluid fed to a mechanical brake device;

DESCRIPTION OF EMBODIMENTS

Figure 1:
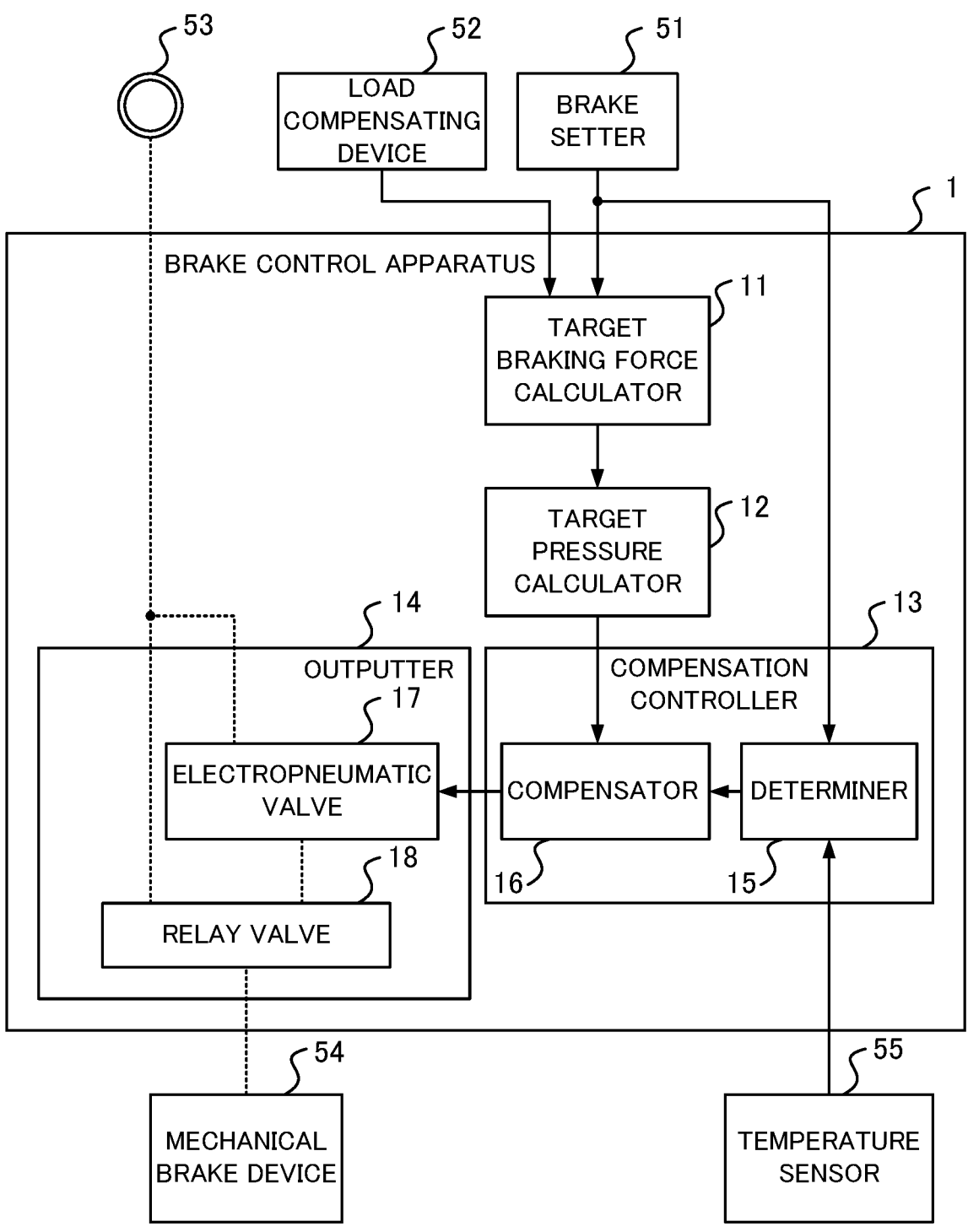
FIG. 1 is a block diagram illustrating a configuration of a brake control apparatus according to Embodiment 1.

A brake control system and a method of controlling brake according to embodiments are described in detail below with reference to the accompanying drawings. In the drawings, the components identical or corresponding to each other are provided with the same reference symbol.

Embodiment 1

The description of Embodiment 1 is directed to a brake control system focusing on an exemplary brake control apparatus 1 installed in a railway vehicle, which is an exemplary vehicle.

As illustrated in FIG. 1, the brake control apparatus 1, which is an exemplary brake control system, calculates a target braking force on the basis of the braking instruction acquired from a brake setter 51 and the weight of the vehicle acquired from a load compensating device 52, and calculates a target pressure, which is a target value of pressure of fluid to be fed to a mechanical brake device 54 for achieving the calculated target braking force. The brake control apparatus 1 compresses the fluid fed from a fluid source 53 in accordance with the target pressure, and feeds the compressed fluid to the mechanical brake device 54. In FIG. 1, the solid line arrows represent electrical signals and the dotted lines represent flows of fluid.

The brake setter 51 is installed in a cab and manipulated by an operator. The braking instruction transmitted from the brake setter 51 to the brake control apparatus 1 contains a normal braking instruction for designating a normal deceleration, which is a target value of deceleration of the vehicle, or an emergency braking instruction for designating an emergency deceleration, which is a target value of deceleration of the vehicle greater than the maximum value of the normal deceleration. The normal braking instruction designates any of the predetermined normal decelerations in accordance with a manipulation on the brake setter 51.

The load compensating device 52 calculates a vehicle weight, which is the sum of the weights of the components including the vehicle bodies, the passengers or loads on the vehicle bodies, the in-vehicle devices, and the bogies, on the basis of the pressure of air inside an air spring that is mounted on a bogie and supports the vehicle body, for example, and then transmits the calculated vehicle weight to the brake control apparatus 1.

The fluid source 53 feeds fluid to the brake control apparatus 1. The fluid used in Embodiment 1 is air.

The mechanical brake device 54 includes a brake cylinder, a piston to shift depending on the pressure of fluid inside the brake cylinder, and a friction member attached to the piston. The compressed air fed from the brake control apparatus 1 to the brake cylinder increases the pressure of air inside the brake cylinder, so that the friction member is pressed against a rotating body that rotates during running of the vehicle, thereby generating a mechanical braking force to cause the vehicle to decelerate. The friction member is a brake shoe, and the rotating body is a wheel, for example.

When the braking instruction contains an emergency braking instruction, the brake control apparatus 1 executes control for compensating for the gap between the actual braking force, which is an existing braking force generated in the vehicle, and the target braking force, and can therefore suppress a decrease in the actual braking force during emergency brake.

The brake control apparatus 1 includes a target braking force calculator 11 to calculate a target braking force for causing the vehicle to decelerate on the basis of the braking instruction and the vehicle weight, and a target pressure calculator 12 to calculate a target pressure, which is a target value of pressure of air to be fed to the mechanical brake device 54 for activating the mechanical brake device 54, on the basis of the calculated target braking force. The brake control apparatus 1 further includes a compensation controller 13 to execute control for compensating for the gap between the actual braking force and the target braking force when the braking instruction contains an emergency braking instruction, and an outputter 14 to compress the air fed from the fluid source 53 in accordance with the target pressure, and feed the compressed air to the brake cylinder of the mechanical brake device 54.

The individual components of the brake control apparatus 1 are described below.

The target braking force calculator 11 acquires the braking instruction from the brake setter 51, and acquires the vehicle weight from the load compensating device 52. The target braking force calculator 11 then multiplies the deceleration α, which is a normal deceleration or an emergency deceleration, by the vehicle weight WT acquired from the load compensating device 52, as represented in Expression (1) below, and thereby calculates a target braking force BF. The target braking force calculator 11 then provides the calculated target braking force BF to the target pressure calculator 12. For example, the target braking force calculator 11 includes a multiplier to provide a product of the deceleration α indicated by the braking instruction and the vehicle weight WT acquired from the load compensating device 52.

$$BF = \alpha \times WT \qquad (1)$$

The target pressure calculator 12 calculates a target pressure BC, which is a target value of pressure of air to be fed to the brake cylinder of the mechanical brake device 54, on the basis of the target braking force BF calculated by the target braking force calculator 11, as represented in Expression (2) below. The target pressure calculator 12 then provides the calculated target pressure BC to the compensation controller 13. In Expression (2) below, μ indicates a friction coefficient of the contact surface between the friction member of the mechanical brake device 54 and the rotating body that rotates during running of the vehicle. The conversion factor Sf varies depending on the cross-sectional area of the brake cylinder of the mechanical brake device 54. The target pressure calculator 12 preliminarily retains the values of friction coefficient μ and conversion factor Sf. For example, the target pressure calculator 12 includes a multiplier to provide a product of the value 1/(μ×Sf) stored in a memory, which is not illustrated, and the target braking force BF acquired from the target braking force calculator 11.

$$BC = BF/(\mu \times Sf) \qquad (2)$$

The compensation controller 13 executes control for compensating for the gap between the actual braking force and the target braking force when the braking instruction contains an emergency braking instruction. In detail, the compensation controller 13 includes a determiner 15 to determine whether compensation is necessary for the gap between the actual braking force and the target braking force, and a compensator 16 to compensate for the gap between the actual braking force and the target braking force when the determiner 15 determines that compensation is necessary for the gap between the actual braking force and the target braking force.

The determiner 15 acquires the braking instruction from the brake setter 51, and acquires the temperature of the friction member of the mechanical brake device 54 from a temperature sensor 55. When the braking instruction contains an emergency braking instruction, the determiner 15 determines whether compensation is necessary for the gap between the actual braking force and the target braking force, on the basis of the temperature of the friction member. The temperature sensor 55 is attached to the friction member to measure the temperature of the friction member.

In detail, the determiner 15 determines whether the temperature of the friction member is at least a threshold temperature. A rise in the temperature of the friction member causes a reduction in the friction coefficient of the contact surface between the friction member and the rotating body. The actual braking force accordingly decreases, despite of a constant pressure of air inside the brake cylinder and a constant force of pressing the friction member against the rotating body. The condition that the temperature of the friction member is at least the threshold temperature is therefore deemed to be a situation that compensation is necessary for the gap between the actual braking force and the target braking force.

The threshold temperature may be defined depending on the thermal properties of the friction coefficient of the contact surface between the friction member and the rotating body. For example, the threshold temperature is defined to be lower than the temperature of the friction member at the start of a significant reduction in the friction coefficient of the contact surface between the friction member and the rotating body. For example, the determiner 15 includes a comparator to compare the temperature acquired from the temperature sensor 55 with the threshold temperature. The comparator then outputs a determination signal indicating 1 when the temperature acquired from the temperature sensor 55 is at least the threshold temperature, and outputs a determination signal indicating 0 when the temperature acquired from the temperature sensor 55 is lower than the threshold temperature.

When the temperature of the friction member is at least the threshold temperature, the determiner 15 provides the compensator 16 with the determination result indicating that compensation is necessary for the gap between the actual braking force and the target braking force. In contrast, when the temperature of the friction member is lower than the threshold temperature, the determiner 15 provides the compensator 16 with the determination result indicating that no compensation is necessary for the gap between the actual braking force and the target braking force.

When the determination result acquired from the determiner 15 indicates that compensation is necessary for the gap between the actual braking force and the target braking force, the compensator 16 adjusts the target pressure BC calculated by the target pressure calculator 12, and provides the outputter 14 with the adjusted the target pressure BC'. In detail, when the determination result acquired from the determiner 15 indicates that compensation is necessary for the gap between the actual braking force and the target braking force, the compensator 16 provides the outputter 14 with the target pressure BC' obtained by increasing the target pressure BC. In contrast, when the determination result acquired from the determiner 15 indicates that no compensation is necessary for the gap between the actual braking force and the target braking force, the compensator 16 provides the outputter 14 with the target pressure BC calculated by the target pressure calculator 12. For example, the compensator 16 includes a multiplier to provide a product of the target pressure BC calculated by the target pressure calculator 12 and a positive coefficient greater than 1, when the comparator of the determiner 15 outputs a determination signal indicates 1.

The outputter 14 compresses the air fed from the fluid source 53 in accordance with the target pressure, and feeds the compressed air to the brake cylinder of the mechanical brake device 54. In detail, the outputter 14 includes an electropneumatic valve 17 to adjust the pressure of air fed from the fluid source 53 in accordance with the target pressure BC or the adjusted the target pressure BC', and output the air having the adjusted pressure, and a relay valve 18 to compress the air fed from the fluid source 53 in accordance with a designated pressure, which is the pressure of air output from the electropneumatic valve 17, and feed the compressed air to the mechanical brake device 54.

The electropneumatic valve 17 acquires the target pressure BC or the adjusted the target pressure BC from the compensator 16. The electropneumatic valve 17 then adjusts the pressure of the air fed from the fluid source 53 in accordance with the target pressure BC or the adjusted the target pressure BC', and outputs the air having the adjusted pressure. In other words, when the determination result acquired from the determiner 15 indicates that compensation is necessary for the gap between the actual braking force and the target braking force, the pressure of air to be output from the electropneumatic valve 17 corresponds to the adjusted target pressure BC' obtained by increasing the target pressure BC at the compensator 16. In contrast, when the determination result acquired from the determiner 15 indicates that no compensation is necessary for the gap between the actual braking force and the target braking force, the pressure of air to be output from the electropneumatic valve 17 corresponds to the target pressure BC calculated by the target pressure calculator 12.

The relay valve 18 compresses the air fed from the fluid source 53 in accordance with the designated pressure, which is the pressure of air output from the electropneumatic valve 17, and feeds the compressed air to the brake cylinder of the mechanical brake device 54.

Figure 2:
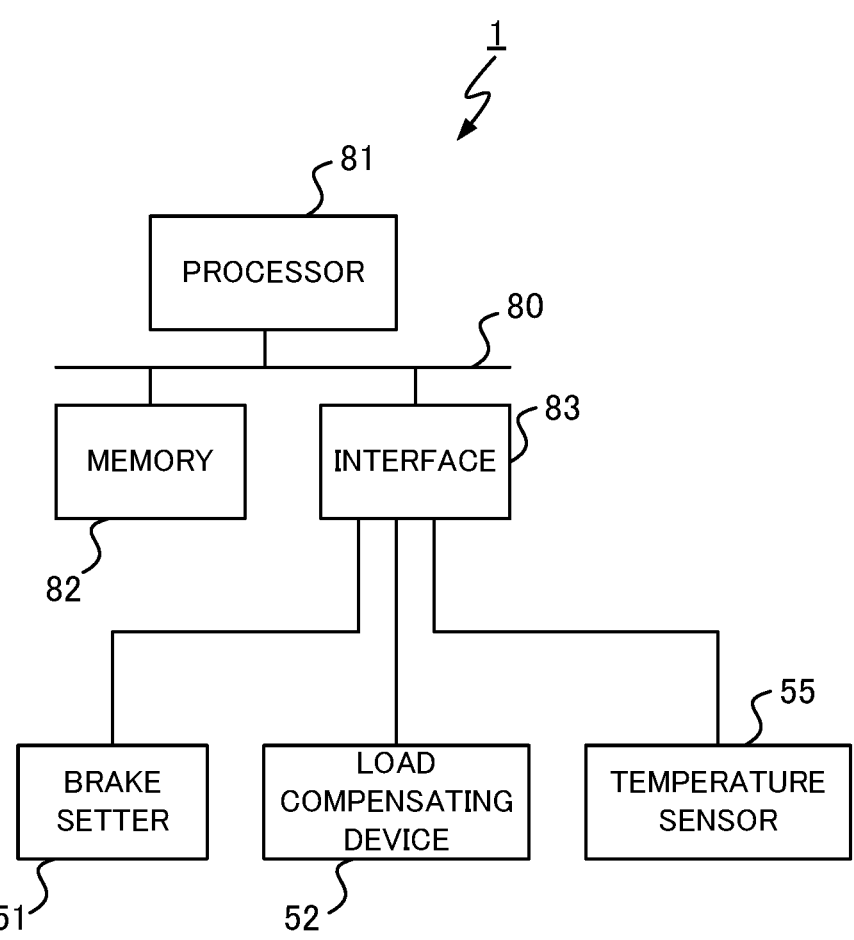
FIG. 2 is a block diagram illustrating a hardware configuration of the brake control apparatus according to Embodiment 1.

The control unit of the above-described brake control apparatus 1 has a hardware configuration including a processor 81, a memory 82, and an interface 83, as illustrated in FIG. 2. The processor 81, the memory 82, and the interface 83 are connected to each other via buses 80. The functions of the control unit of the brake control apparatus 1 are performed because the processor 81 executes programs stored in the memory 82. The interface 83 serves to connect the brake control apparatus 1 to external devices and establish communication. In detail, the brake control apparatus 1 is connected to the brake setter 51, the load compensating device 52, and the temperature sensor 55 via the interface 83. The interface 83 may include multiple types of interface modules as necessary.

Although the control unit of the brake control apparatus 1 includes a single processor 81 and a single memory 82 in FIG. 2, the control unit of the brake control apparatus 1 may include multiple processors 81 and multiple memories 82. In this case, the processors 81 and the memories 82 cooperate with each other and thereby perform the individual functions of the control unit of the brake control apparatus 1.

A summary of operations of compensation control executed by the brake control apparatus 1 having the above-described configuration is described below with reference to FIG. 3.

Figure 3:
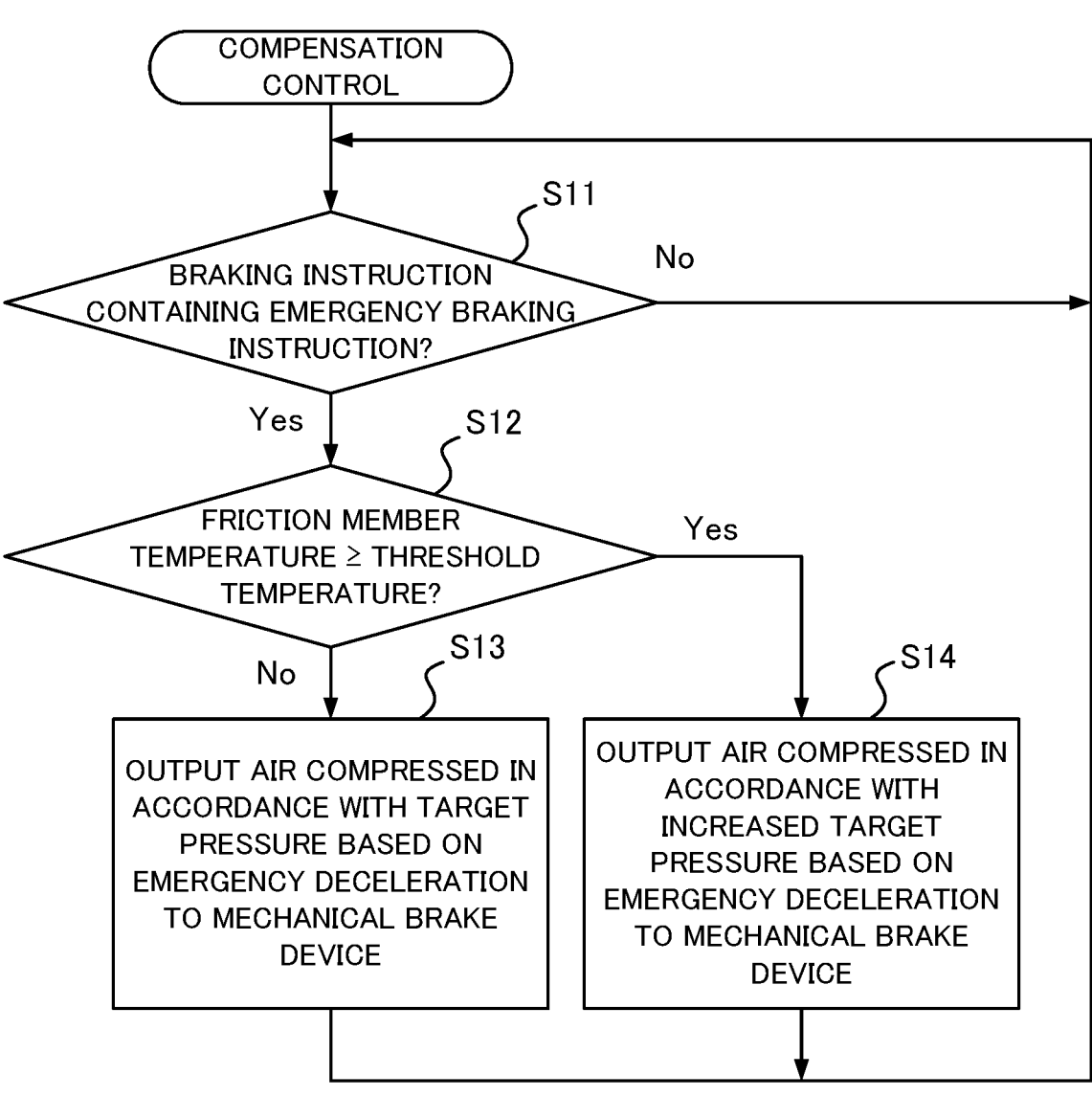
FIG. 3 is a flowchart illustrating exemplary operations of compensation control executed by the brake control apparatus according to Embodiment 1.

The brake control apparatus 1 initiates the processing illustrated in FIG. 3 in response to input of a braking instruction from the brake setter 51. When the braking instruction does not contain an emergency braking instruction (Step S11; No), the target braking force calculator 11 of the brake control apparatus 1 repeats the process in Step S11. In other words, when the braking instruction does not contain an emergency braking instruction, the brake control apparatus 1 skips the subsequent compensation control, and executes brake control, which is not illustrated, for achieving the normal deceleration indicated by the normal braking instruction.

When the braking instruction contains an emergency braking instruction (Step S11; Yes), the target braking force calculator 11 of the brake control apparatus 1 calculates a target braking force on the basis of the emergency deceleration $\alpha1$ indicated by the emergency braking instruction and the vehicle weight, and the target pressure calculator 12 calculates a target pressure on the basis of the calculated target braking force. In other words, the target pressure calculated by the target pressure calculator 12 is based on the emergency deceleration. The determiner 15 determines whether the temperature of the friction member acquired from the temperature sensor 55 is at least the threshold temperature (Step S12).

When the temperature of the friction member is lower than the threshold temperature (Step S12; No), the compensator 16 provides the outputter 14 with the target pressure based on the emergency deceleration, and the outputter 14 compresses the air fed from the fluid source 53 in accordance with the target pressure, and feeds the compressed air to the mechanical brake device 54 (Step S13). The fed air activates the mechanical brake device 54, thereby generating a mechanical braking force for achieving the emergency deceleration.

In contrast, when the temperature of the friction member is at least the threshold temperature (Step S12; Yes), the compensator 16 provides the outputter 14 with a target pressure obtained by increasing the target pressure based on the emergency deceleration, and the outputter 14 compresses the air fed from the fluid source 53 in accordance with the increased target pressure, and feeds the compressed air to the mechanical brake device 54 (Step S14). The fed air activates the mechanical brake device 54, thereby generating a mechanical braking force for achieving the emergency deceleration while suppressing a decrease in the braking force caused by a rise in the temperature of the friction member. After completion of the process in Step S13 or S14, the brake control apparatus 1 executes the process in Step S11 again.

The brake control apparatus 1 having the above-described configuration executes operations of brake control, which is described below with reference to the timing chart in the sections (A) to (D) of FIG. 4. The description of Embodiment 1 assumes that, as illustrated in the section (A) of FIG. 4, no braking instruction has been input from the brake setter 51 to the brake control apparatus 1 until the time T1, and a braking instruction containing an emergency braking instruction is input from the brake setter 51 to the brake control apparatus 1 at the time T1.

Until the time T1, the velocity of the vehicle has been equal to the velocity V1 as illustrated in the section (B) of FIG. 4, and the temperature of the friction member has been equal to the temperature Te1 as illustrated in the section (C) of FIG. 4. Until the time T1, the pressure of air fed to the mechanical brake device 54 has been equal to the pressure BC0 as illustrated in the section (D) of FIG. 4. The description assumes that no mechanical braking force is generated in the case of the pressure of air inside the brake cylinder equal to the pressure BC0, because of no contact of the friction member with the rotating body.

As illustrated in the section (A) of FIG. 4, when a braking instruction containing an emergency braking instruction is input from the brake setter 51 to the brake control apparatus 1 at the time T1, the target braking force calculator 11 calculates a target braking force BF, on the basis of the emergency deceleration $\alpha 1$ indicated by the emergency braking instruction and the vehicle weight WT acquired from the load compensating device 52. The target pressure calculator 12 then calculates a target pressure BC1, which is a target value of pressure of fluid to be fed to the mechanical brake device 54, on the basis of the target braking force BF calculated by the target braking force calculator 11. In other words, the target pressure BC1 calculated by the target pressure calculator 12 is based on the emergency deceleration $\alpha 1$.

As illustrated in the section (C) of FIG. 4, the determiner 15 determines that the temperature Te1 of the friction member is lower than the threshold temperature Th1 at the time T1. The compensator 16 thus provides the electropneumatic valve 17 with the target pressure BC1 calculated by the target pressure calculator 12.

The electropneumatic valve 17 adjusts the pressure of air fed from the fluid source 53 in accordance with the target pressure BC1, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. Accordingly, as illustrated in the section (D) of FIG. 4, the pressure of air fed to the mechanical brake device 54 starts to increase from the pressure BC0 and then reaches the pressure BC1.

When the mechanical brake device 54 starts the operation at the time T1 and continues the operation, the temperature of the friction member rises as illustrated in the section (C) of FIG. 4. The temperature of the friction member then reaches the threshold temperature Th1 at a time defined as T2.

As illustrated in the section (C) of FIG. 4, the determiner 15 determines that the temperature of the friction member is at least the threshold temperature Th1 at the time T2. The compensator 16 thus increases the target pressure BC1 calculated by the target pressure calculator 12, and provides the electropneumatic valve 17 with the increased target pressure BC2. The target pressure BC2 is 1.2 times as high as the target pressure BC1, for example.

The electropneumatic valve 17 adjusts the pressure of air fed from the fluid source 53 in accordance with the target pressure BC2, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. Accordingly, as illustrated in the section (D) of FIG. 4, the pressure of air fed to the mechanical brake device 54 starts to increase from the pressure BC1 and then reaches the pressure BC2. The vehicle then stops at the time T3.

As described above, the brake control apparatus 1 according to Embodiment 1 increases the target pressure BC1 based on the emergency deceleration $\alpha 1$ when the temperature of the friction member is at least the threshold temperature, and feeds the air compressed in accordance with the increased target pressure BC2 to the mechanical brake device 54. The brake control apparatus 1 thereby compensates for the gap between the actual braking force and the target braking force, and can therefore suppress a decrease in the actual braking force during emergency brake.

Embodiment 2

The vehicle in Embodiment 1 is a mere example and may be replaced with a vehicle that decelerates by receiving at least either of a mechanical braking force and an electric braking force. The description of Embodiment 2 is directed to a brake control apparatus 2 that can generate both of a mechanical braking force and an electric braking force.

Figure 5:
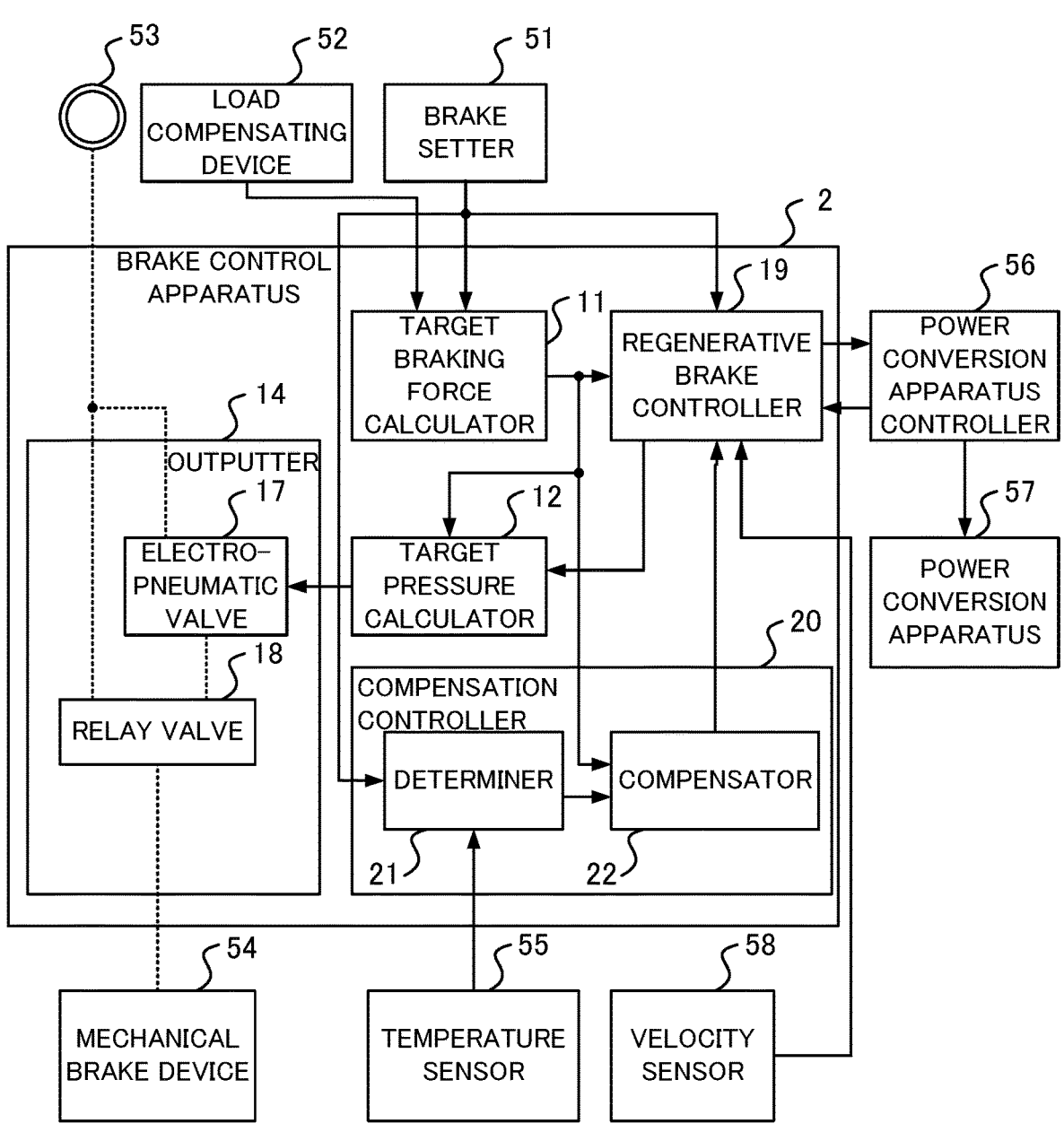
FIG. 5 is a block diagram illustrating a configuration of a brake control apparatus according to Embodiment 2.

The brake control apparatus 2 according to Embodiment 2 illustrated in FIG. 5 includes, in addition to the components of the brake control apparatus 1 according to Embodiment 1, a regenerative brake controller 19 to transmit a regenerative pattern signal to a power conversion apparatus controller 56 for controlling a power conversion apparatus 57, which is described below, and thus induces generation of an electric braking force. The brake control apparatus 2 includes a compensation controller 20 to execute control for compensating for the gap between the actual braking force and the target braking force when the braking instruction contains an emergency braking instruction. The individual components of the brake control apparatus 2 are described below focusing on the differences from the brake control apparatus 1.

The target braking force calculator 11 calculates a target braking force BF as in Embodiment 1, and provides the calculated target braking force BF to the target pressure calculator 12, the regenerative brake controller 19, and a compensator 22, which is described below, included in the compensation controller 20.

The regenerative brake controller 19 acquires the target electric braking force from each of the target braking force calculator 11 and the compensator 22 of the compensation controller 20, and acquires the velocity of the vehicle from a velocity sensor 58 for measuring a velocity of the vehicle. When the velocity of the vehicle is at least a threshold velocity, the regenerative brake controller 19 executes control for generating an electric braking force. The velocity sensor 58 includes a pulse generator (PG) that is mounted on an axle and outputs a sensor signal of which the frequency varies depending on the rotational speed of the axle, and outputs the velocity of the vehicle calculated based on the sensor signal. The threshold velocity is defined to be higher than the critical velocity that can cause a regeneration failure.

In detail, when the velocity of the vehicle is at least the threshold velocity and when the braking instruction contains a normal braking instruction, the regenerative brake controller 19 calculates a target electric braking force, which is a target value of the electric braking force, on the basis of the target braking force acquired from the target braking force calculator 11, and transmits a regenerative pattern signal indicating the target electric braking force to the power conversion apparatus controller 56.

In contrast, when the velocity of the vehicle is at least the threshold velocity and when the braking instruction contains an emergency braking instruction, the regenerative brake controller 19 calculates a target electric braking force on the basis of the target electric braking force acquired from the compensator 22, and transmits a regenerative pattern signal indicating the target electric braking force to the power conversion apparatus controller 56.

The regenerative brake controller 19 further acquires a regenerative feedback signal indicating the actual electric braking force, which is the existing electric braking force, from the power conversion apparatus controller 56. The regenerative brake controller 19 then provides the actual electric braking force to the target pressure calculator 12.

The power conversion apparatus controller 56 controls switching elements included in the power conversion apparatus 57 in accordance with a power running instruction that is provided from a cab, which is not illustrated, and designates an acceleration of the vehicle. The power conversion apparatus 57 thus feeds electric power to a motor, which is not illustrated, and drives the motor, thereby generating a propulsive force of the vehicle. The power conversion apparatus controller 56 controls the switching elements of the power conversion apparatus 57 in accordance with the regenerative pattern signal acquired from the regenerative brake controller 19, calculates an actual electric braking force, which is the existing electric braking force generated through the operation of the power conversion apparatus 57, and transmits a regenerative feedback signal indicating the actual electric braking force to the regenerative brake controller 19.

A typical example of the power conversion apparatus 57 is an inverter. The power conversion apparatus 57 converts DC power fed from a power source via primary terminals into three-phase AC power for driving the motor, and feeds the converted three-phase AC power to the motor. The motor fed with the three-phase AC power is driven to generate a propulsive force of the vehicle. The power conversion apparatus 57 also converts three-phase AC power fed from the motor that functions as an electric generator during regenerative brake into DC power, and outputs the converted DC power. The DC power output from the power conversion apparatus 57 is fed to other vehicles running in the vicinity via an overhead wire, so that the electric power generated by the motor that functions as an electric generator is consumed, resulting in generation of an electric braking force.

The target pressure calculator 12 acquires the target braking force BF from the target braking force calculator 11, and acquires the actual electric braking force from the regenerative brake controller 19. The target pressure calculator 12 then subtracts the actual electric braking force from the target braking force BF, and thereby calculates a target mechanical braking force MB, which is a target value of the mechanical braking force. The target pressure calculator 12 assigns the target mechanical braking force MB to the target braking force BF in the above Expression (2), and thereby calculates a target pressure BC.

The compensation controller 20 includes a determiner 21 to determine whether compensation is necessary for the gap between the actual braking force and the target braking force on the basis of the temperature of the friction member, and the compensator 22 to compensate for the gap between the actual braking force and the target braking force when the determiner 21 determines that compensation is necessary for the gap between the actual braking force and the target braking force.

The determiner 21 acquires the braking instruction from the brake setter 51, and acquires the temperature of the friction member of the mechanical brake device 54 from the temperature sensor 55. When the braking instruction contains an emergency braking instruction, the determiner 21 determines whether the temperature of the friction member is at least the threshold temperature, like the determiner 15 of the compensation controller 13 included in the brake control apparatus 1 according to Embodiment 1. The condition that the temperature of the friction member is at least the threshold temperature is deemed to be a situation that compensation is necessary for the gap between the actual braking force and the target braking force, as in Embodiment 1. For example, the determiner 21 includes a comparator to compare the temperature acquired from the temperature sensor 55 with the threshold temperature. The comparator then outputs a determination signal indicating 1 when the temperature acquired from the temperature sensor 55 is at least the threshold temperature, and outputs a determination signal indicating 0 when the temperature acquired from the temperature sensor 55 is lower than the threshold temperature.

When the temperature of the friction member is at least the threshold temperature, the determiner 21 provides the compensator 22 with the determination result indicating that compensation is necessary for the gap between the actual braking force and the target braking force. In contrast, when the temperature of the friction member is lower than the threshold temperature, the determiner 21 provides the compensator 22 with the determination result indicating that no compensation is necessary for the gap between the actual braking force and the target braking force.

When the determination result acquired from the determiner 21 indicates that compensation is necessary for the gap between the actual braking force and the target braking force, the compensator 22 calculates a target electric braking force, which is a target value of the electric braking force, on the basis of the target braking force. For example, when the determination result acquired from the determiner 21 indicates that compensation is necessary for the gap between the actual braking force and the target braking force, the compensator 22 uses the target braking force as the target electric braking force. In contrast, when the determination result acquired from the determiner 21 indicates that no compensation is necessary for the gap between the actual braking force and the target braking force, the compensator 22 determines the target electric braking force to be 0, regardless of the target braking force. The compensator 22 then provides the calculated target electric braking force to the regenerative brake controller 19. For example, the compensator 22 includes a logic circuit to output the target electric braking force acquired from the target braking force calculator 11 when the comparator of the determiner 21 outputs a determination signal indicating 1, and output 0 when the comparator of the determiner 21 outputs a determination signal indicating 0.

The brake control apparatus 2 has the hardware configuration that is the same as that in Embodiment 1, except for that the brake control apparatus 2 communicates with the brake setter 51, the load compensating device 52, the temperature sensor 55, the power conversion apparatus controller 56, and the velocity sensor 58 via the interface 83.

A summary of operations of compensation control executed by the brake control apparatus 2 having the above-described configuration is described below with reference to FIG. 6.

Figure 6:
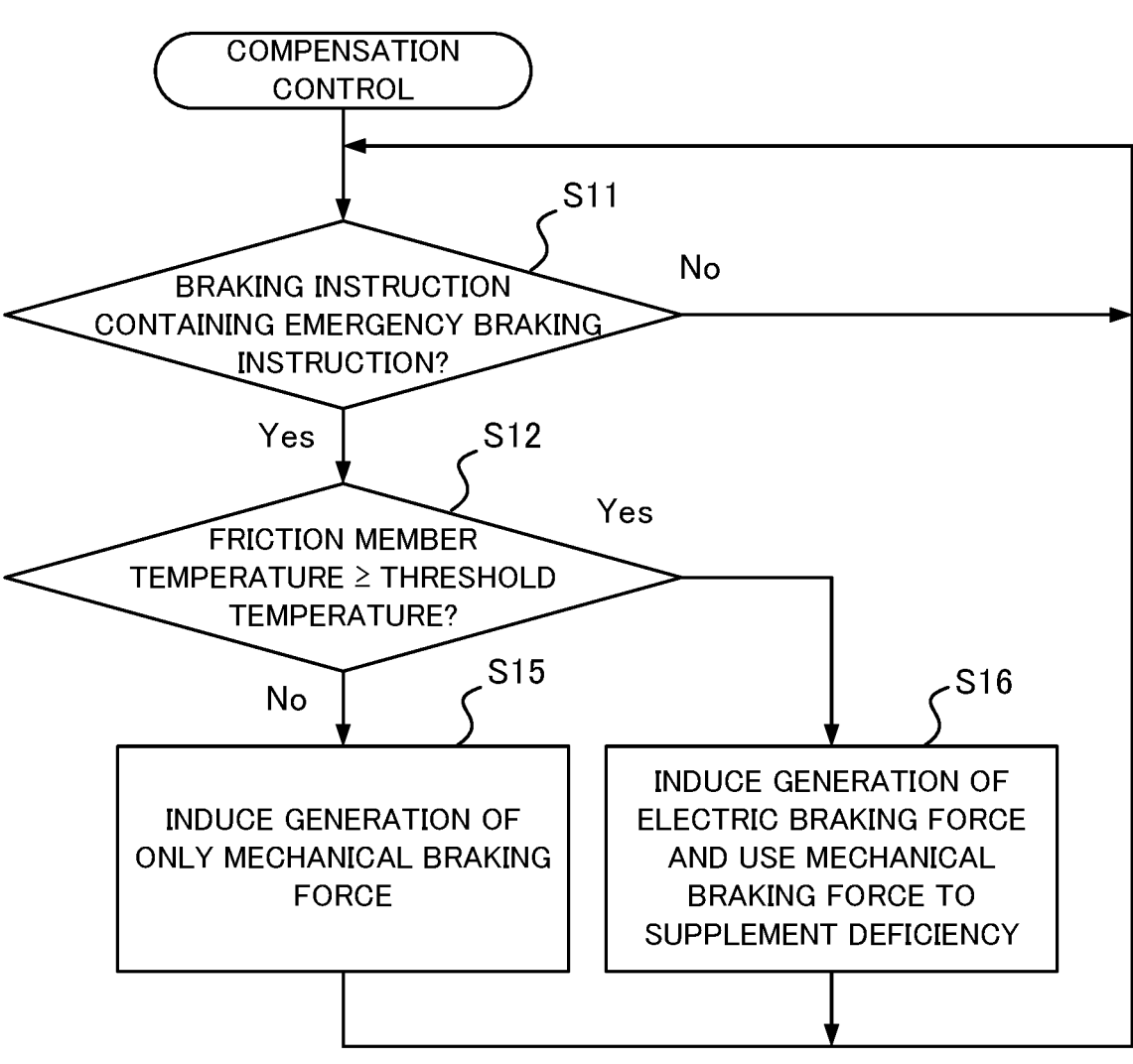
FIG. 6 is a flowchart illustrating exemplary operations of compensation control executed by the brake control apparatus according to Embodiment 2.

The brake control apparatus 2 initiates the processing illustrated in FIG. 6 in response to input of a braking instruction from the brake setter 51. The processes in Steps S11 and S12 are the same as those executed by the brake control apparatus 1 illustrated in FIG. 3.

When the temperature of the friction member is lower than the threshold temperature (Step S12; No), the compensator 22 provides the regenerative brake controller 19 with the target electric braking force equal to 0, so that no electric braking force is generated. Because of the target mechanical braking force equal to the target braking force, the outputter 14 is provided with the target pressure based on the emergency deceleration. The outputter 14 then compresses the air fed from the fluid source 53 in accordance with the target pressure, and feeds the compressed air to the mechanical brake device 54. The brake control apparatus 2 accordingly induces generation of only a mechanical braking force (Step S15).

In contrast, when the temperature of the friction member is at least the threshold temperature (Step S12; No), the compensator 22 provides the regenerative brake controller 19 with the target electric braking force calculated on the basis of the target braking force, so that an electric braking force is generated. The outputter 14 is thus provided with the target pressure calculated by the target pressure calculator 12 on the basis of the target mechanical braking force, which is obtained by subtracting the actual electric braking force from the target braking force calculated by the target braking force calculator 11 on the basis of the emergency deceleration. The outputter 14 compresses the air fed from the fluid source 53 in accordance with the target pressure, and feeds the compressed air to the mechanical brake device 54. The brake control apparatus 2 accordingly induces generation of an electric braking force, and uses the mechanical braking force to supplement the deficiency (Step S16). After completion of the process in Step S15 or S16, the brake control apparatus 2 executes the process in Step S11 again.

The brake control apparatus 2 having the above-described configuration executes operations of brake control, which is described below with reference to the timing chart in the sections (A) to (F) of FIG. 7. The description of Embodiment 2 assumes that, as illustrated in the section (A) of FIG. 7, no braking instruction has been input from the brake setter 51 to the brake control apparatus 2 until the time T11, and a braking instruction containing an emergency braking instruction is input from the brake setter 51 to brake control apparatus 2 at the time T11.

Figure 7:
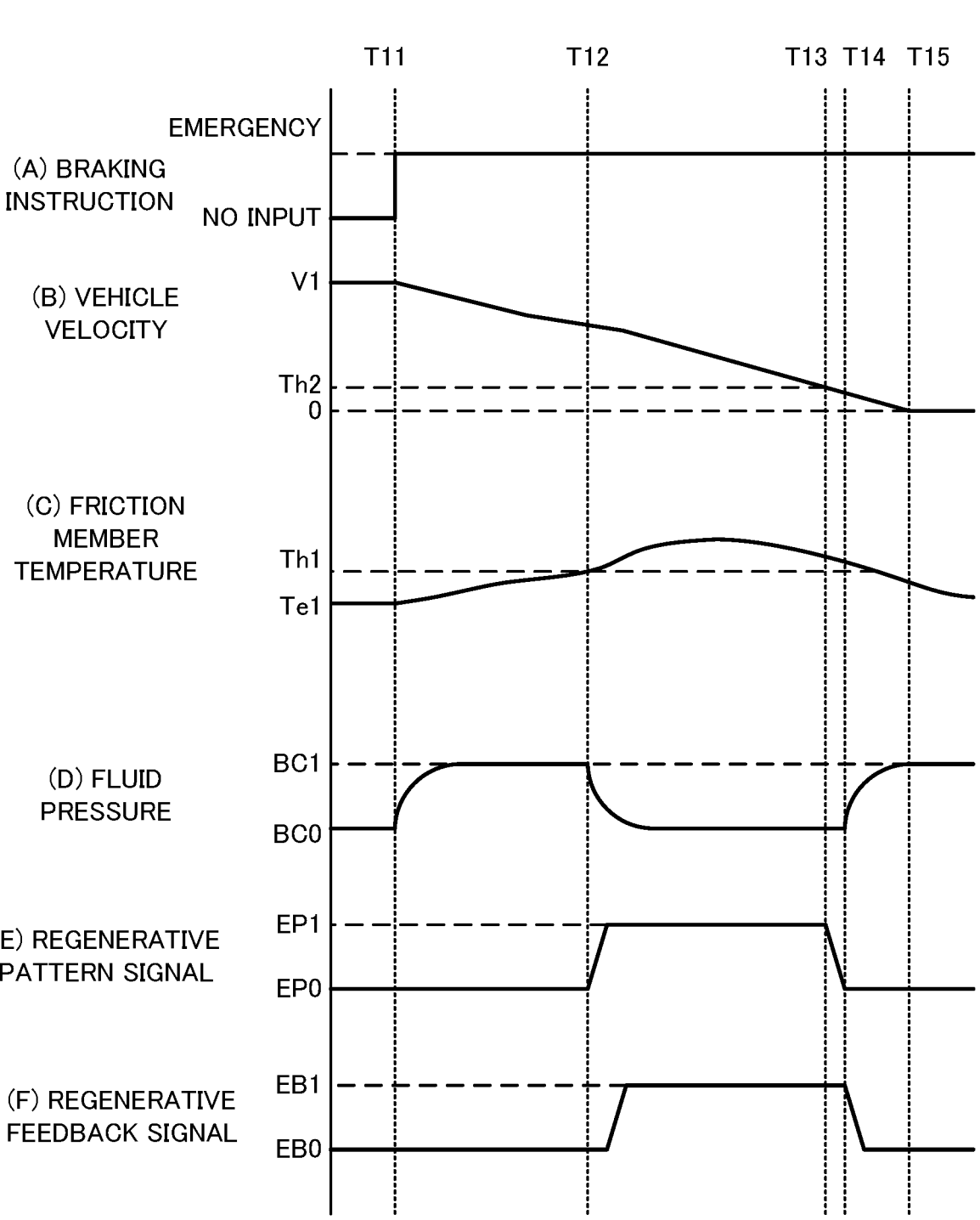
FIG. 7 is a timing chart illustrating exemplary operations of brake control executed by the brake control apparatus according to Embodiment 2, the section (A) illustrates a braking instruction, the section (B) illustrates a velocity of a vehicle, the section (C) illustrates a temperature of a friction member, the section (D) illustrates a pressure of fluid fed to a mechanical brake device, the section (E) illustrates a regenerative pattern signal, and the section (F) illustrates a regenerative feedback signal.

Until the time T11, the velocity of the vehicle has been equal to the velocity V1 as illustrated in the section (B) of FIG. 7, and the temperature of the friction member has been equal to the temperature Te1 as illustrated in the section (C) of FIG. 7. Until the time T11, the pressure of air fed to the mechanical brake device 54 has been equal to the pressure BC0 as illustrated in the section (D) of FIG. 7. No mechanical braking force is generated in the case of the pressure of air inside the brake cylinder equal to the pressure BC0, because of no contact of the friction member with the rotating body.

Since no braking instruction has been input from the brake setter 51 to the brake control apparatus 2 until the time T11, the target electric braking force indicated by the regenerative pattern signal has been equal to the target electric braking force EP0 corresponding to 0, as illustrated in the section (E) of FIG. 7, so that no electric braking force is generated. Accordingly, as illustrated in the section (F) of FIG. 7, the actual electric braking force indicated by the regenerative feedback signal has been equal to the actual electric braking force EB0 corresponding to 0.

As illustrated in the section (A) of FIG. 7, when a braking instruction containing an emergency braking instruction is input from the brake setter 51 to the brake control apparatus 2 at the time T11, the target braking force calculator 11 calculates a target braking force BF, on the basis of the emergency deceleration α1 indicated by the emergency braking instruction and the vehicle weight WT acquired from the load compensating device 52.

As illustrated in the section (C) of FIG. 7, the determiner 21 determines that the temperature Te1 of the friction member is lower than the threshold temperature Th1 at the time T11. The compensator 22 thus calculates the target electric braking force EP0 corresponding to 0 regardless of the target braking force BF, and provides the calculated target electric braking force EP0 to the regenerative brake controller 19.

Because of the braking instruction containing an emergency braking instruction, the regenerative brake controller 19 acquires the target electric braking force EP0 from the compensator 22, and transmits a regenerative pattern signal indicating the acquired target electric braking force EP0 to the power conversion apparatus controller 56. Since the target electric braking force indicated by the regenerative pattern signal is equal to the target electric braking force EP0 as illustrated in the section (E) of FIG. 7 as described above, no regenerative braking force is generated. The actual electric braking force indicated by the regenerative feedback signal is accordingly equal to the actual electric braking force EB0, as illustrated in the section (F) of FIG. 7.

The target pressure calculator 12 subtracts the actual electric braking force EB0 from the target braking force BF calculated by the target braking force calculator 11, and thereby calculates a target mechanical braking force MB. The target pressure calculator 12 then calculates a target pressure BC, which is a target value of pressure of fluid to be fed to the mechanical brake device 54, on the basis of the target mechanical braking force MB. When the actual electric braking force is equal to the actual electric braking force EB0, the target pressure calculated by the target pressure calculator 12 is equal to the target pressure BC1 based on the emergency deceleration α1.

The electropneumatic valve 17 adjusts the pressure of air fed from the fluid source 53 in accordance with the target pressure BC1, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. Accordingly, as illustrated in the section (D) of FIG. 7, the pressure of air fed to the mechanical brake device 54 increases from the pressure BC0 and then reaches the pressure BC1.

When the mechanical brake device 54 starts the operation at the time T11 and continues the operation, the temperature of the friction member rises as illustrated in the section (C) of FIG. 7. The temperature of the friction member then reaches the threshold temperature Th1 at a time defined as T12.

As illustrated in the section (C) of FIG. 7, the determiner 21 determines that the temperature of the friction member is at least the threshold temperature Th1 at the time T12. The compensator 22 thus calculates a target electric braking force, which is a target value of the electric braking force, on the basis of the target braking force BF calculated by the target braking force calculator 11. The target electric braking force calculated on the basis of this target braking force BF is defined as EP1. The compensator 22 then provides the calculated target electric braking force EP1 to the regenerative brake controller 19.

Because of the braking instruction containing an emergency braking instruction, the regenerative brake controller 19 acquires the target electric braking force EP1 from the compensator 22, and transmits a regenerative pattern signal indicating the acquired target electric braking force EP1 to the power conversion apparatus controller 56. This operation results in generation of an electric braking force. In the example illustrated in the section (E) of FIG. 7, the regenerative brake controller 19 gradually changes the value of the regenerative pattern signal.

As illustrated in the section (F) of FIG. 7, the actual electric braking force then increases from EB0 to EB1. The actual electric braking force EB1 indicates the actual electric braking force generated in response to control of the power conversion apparatus controller 56 over the power conversion apparatus 57 in accordance with the regenerative pattern signal indicating the target electric braking force EP1.

The regenerative brake controller 19 acquires a regenerative feedback signal indicating the actual electric braking force, and provides the actual electric braking force to the target pressure calculator 12.

The target pressure calculator 12 subtracts the actual electric braking force from the target braking force BF, and thereby calculates a target mechanical braking force MB, which is a target value of the mechanical braking force. The target pressure calculator 12 then calculates a target pressure BC on the basis of the target mechanical braking force MB. The example illustrated in FIG. 7 assumes that the actual electric braking force EB1 is at least the target braking force BF. The target pressure BC calculated by the target pressure calculator 12 thus decreases as the actual electric braking force increases from EB0 to EB1, and then reaches the target pressure BC0.

The electropneumatic valve 17 adjusts the pressure of air fed from the fluid source 53 in accordance with the target pressure, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. Accordingly, as illustrated in the section (D) of FIG. 7, the pressure of air fed to the mechanical brake device 54 decreases from the pressure BC1 and then reaches the pressure BC0. The mechanical brake device 54 thus stops the operation.

The vehicle decelerates after the time T12. When the vehicle velocity reaches the threshold velocity Th2 at the time T13 as illustrated in the section (B) of FIG. 7, the regenerative brake controller 19 terminates the control for generating an electric braking force. In detail, the regenerative brake controller 19 outputs a regenerative pattern signal indicating the target electric braking force EP0, so that no electric braking force is generated. In the example illustrated in the section (E) of FIG. 7, the regenerative brake controller 19 gradually changes the value of the regenerative pattern signal.

As illustrated in the section (F) of FIG. 7, the actual electric braking force starts to decrease from EB1 at the time T14 and then reaches EB0. The regenerative brake controller 19 acquires a regenerative feedback signal indicating the actual electric braking force, and provides the actual electric braking force to the target pressure calculator 12.

The target pressure calculator 12 subtracts the actual electric braking force from the target braking force BF, and thereby calculates a target mechanical braking force MB, which is a target value of the mechanical braking force. The target pressure calculator 12 then calculates a target pressure BC on the basis of the target mechanical braking force MB. The target pressure calculated by the target pressure calculator 12 in the case of the actual electric braking force EB0 is equal to the pressure BC1. The target pressure BC calculated by the target pressure calculator 12 thus increases as the actual electric braking force decreases from EB1 to EB0, and then reaches the target pressure BC1.

The electropneumatic valve 17 adjusts the pressure of air fed from the fluid source 53 in accordance with the target pressure, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. Accordingly, as illustrated in the section (D) of FIG. 7, the pressure of air to be fed to the mechanical brake device 54 starts to increase from the pressure BC0 at the time T14, and then reaches the pressure BC1. The vehicle then stops at the time T15.

The mechanical brake device 54 is stopping the operation during generation of the electric braking force, and thus allows the friction member to sufficiently cool as illustrated in the section (C) of FIG. 7. Consequently, feeding of the air compressed in accordance with the target pressure BC1 based on the emergency deceleration $\alpha 1$ to the mechanical brake device 54 can achieve generation of a mechanical braking force corresponding to the target braking force.

As described above, the brake control apparatus 2 according to Embodiment 2 induces generation of an electric braking force when the temperature of the friction member is at least the threshold temperature. Since the magnitude of the electric braking force does not vary depending on the temperature of the friction member, unlike the magnitude of a mechanical braking force, the brake control apparatus 2 can achieve a target braking force. In other words, the brake control apparatus 2 compensates for the gap between the actual braking force and the target braking force by using an electric braking force instead of a mechanical braking force, and can therefore suppress a decrease in the actual braking force during emergency brake.

Embodiment 3

The procedure of determining whether compensation is necessary for the gap between the actual braking force and the target braking force is not necessarily a determination procedure based on the temperature of the friction member. The description of Embodiment 3 is directed to a brake control apparatus 3 to determine whether compensation is necessary for the gap between the actual braking force and the target braking force on the basis of the deceleration of the vehicle.

Figure 8:
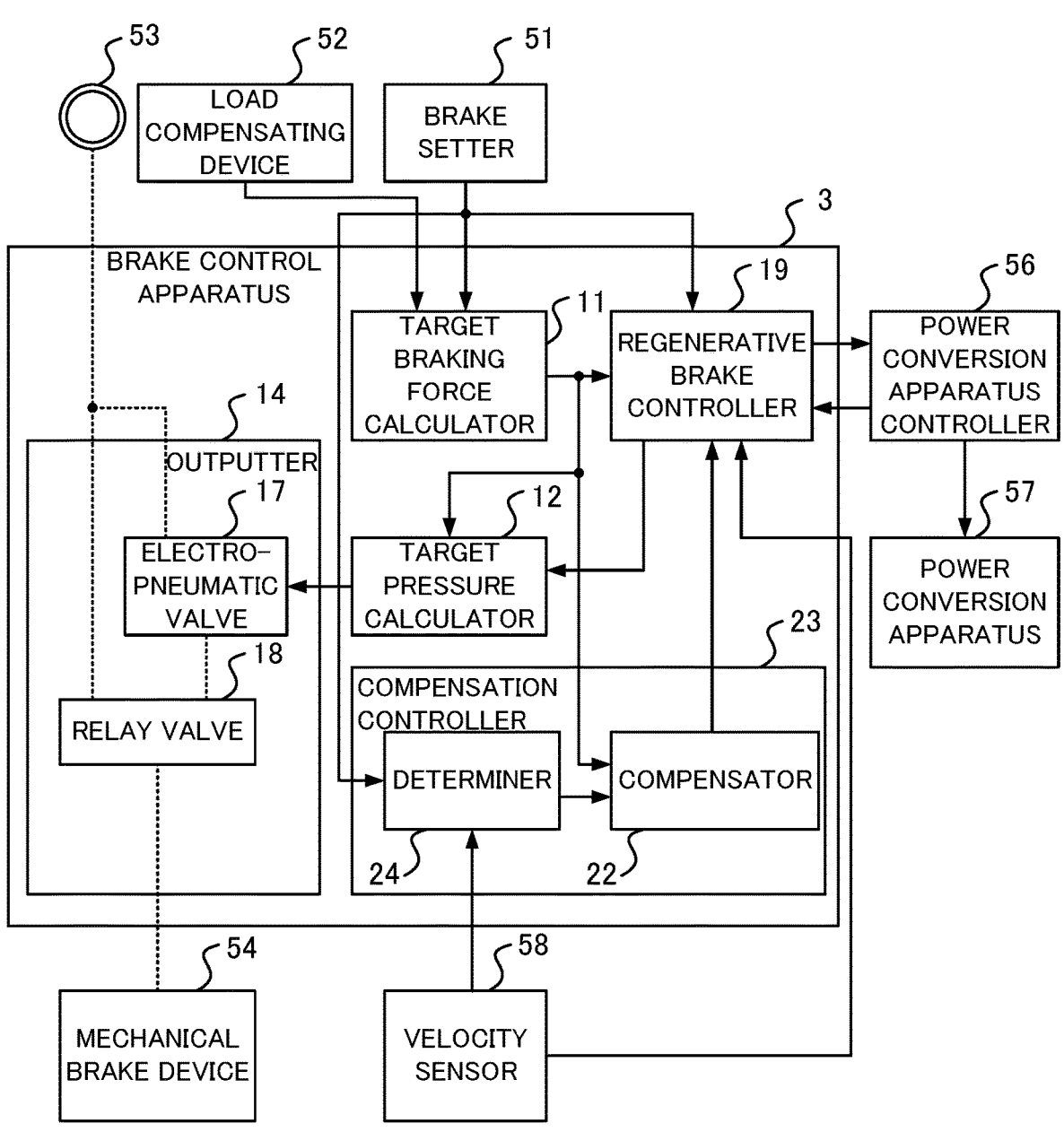
FIG. 8 is a block diagram illustrating a configuration of a brake control apparatus according to Embodiment 3.

The brake control apparatus 3 according to Embodiment 3 illustrated in FIG. 8 includes a compensation controller 23 to execute control for compensating for the gap between the actual braking force and the target braking force when the braking instruction contains an emergency braking instruction. The individual components of the brake control apparatus 3 are described below focusing on the differences from the brake control apparatus 2.

The compensation controller 23 includes a determiner 24 to determine whether compensation is necessary for the gap between the actual braking force and the target braking force on the basis of the deceleration of the vehicle, and a compensator 22. The compensator 22 is the same as the compensator 22 of the compensation controller 20 included in the brake control apparatus 2.

The determiner 24 acquires the braking instruction from the brake setter 51, and acquires the velocity of the vehicle from the velocity sensor 58. The determiner 24 then calculates a deceleration of the vehicle on the basis of a variation in the velocity of the vehicle during a predetermined calculation period. The description assumes that the determiner 24 determines the deceleration of the vehicle to be a positive value, and the emergency deceleration indicated by the emergency braking instruction is a positive value. The calculation period is preliminarily defined depending on an allowable time for calculation of a deceleration of the vehicle. When the braking instruction contains an emergency braking instruction, the determiner 24 determines whether the deceleration of the vehicle is smaller than the emergency deceleration. The condition that the deceleration of the vehicle is smaller than the emergency deceleration is deemed to be a situation that compensation is necessary for the gap between the actual braking force and the target braking force. The circuitry for calculating a deceleration at the determiner 24 can be achieved by a timer, a subtractor, and a divider, for example. The determiner 24 includes a comparator to compare the deceleration calculated by the circuitry for calculating a deceleration with the emergency deceleration, for example. The comparator then outputs a determination signal indicating 1 when the calculated deceleration is smaller than the emergency deceleration, and outputs a determination signal indicating 0 when the calculated deceleration is at least the emergency deceleration.

In order to prevent erroneous determination whether compensation is necessary for the gap between the actual braking force and the target braking force from being determined on the basis of fluctuations in the deceleration of the vehicle, the determiner 24 preferably determines whether the deceleration of the vehicle has been smaller than the emergency deceleration for at least a determination period. The determination period is defined to be long enough to prevent erroneous determination on the basis of the deceleration of the vehicle. The condition that the deceleration of the vehicle has been smaller than the emergency deceleration for at least the determination period is deemed to be a situation that compensation is necessary for the gap between the actual braking force and the target braking force.

When the deceleration of the vehicle has been smaller than the emergency deceleration for at least the determination period, the determiner 24 provides the compensator 22 with the determination result indicating that compensation is necessary for the gap between the actual braking force and the target braking force. In contrast, when the deceleration of the vehicle has been smaller than the emergency deceleration for a period shorter than the determination period, the determiner 24 provides the compensator 22 with the determination result indicating that no compensation is necessary for the gap between the actual braking force and the target braking force.

The brake control apparatus 3 has the hardware configuration that is the same as that in Embodiment 1, except for that the brake control apparatus 3 communicates with the brake setter 51, the load compensating device 52, the power conversion apparatus controller 56, and the velocity sensor 58 via the interface 83.

A summary of operations of compensation control executed by the brake control apparatus 3 having the above-described configuration is described below with reference to FIG. 9.

Figure 9:
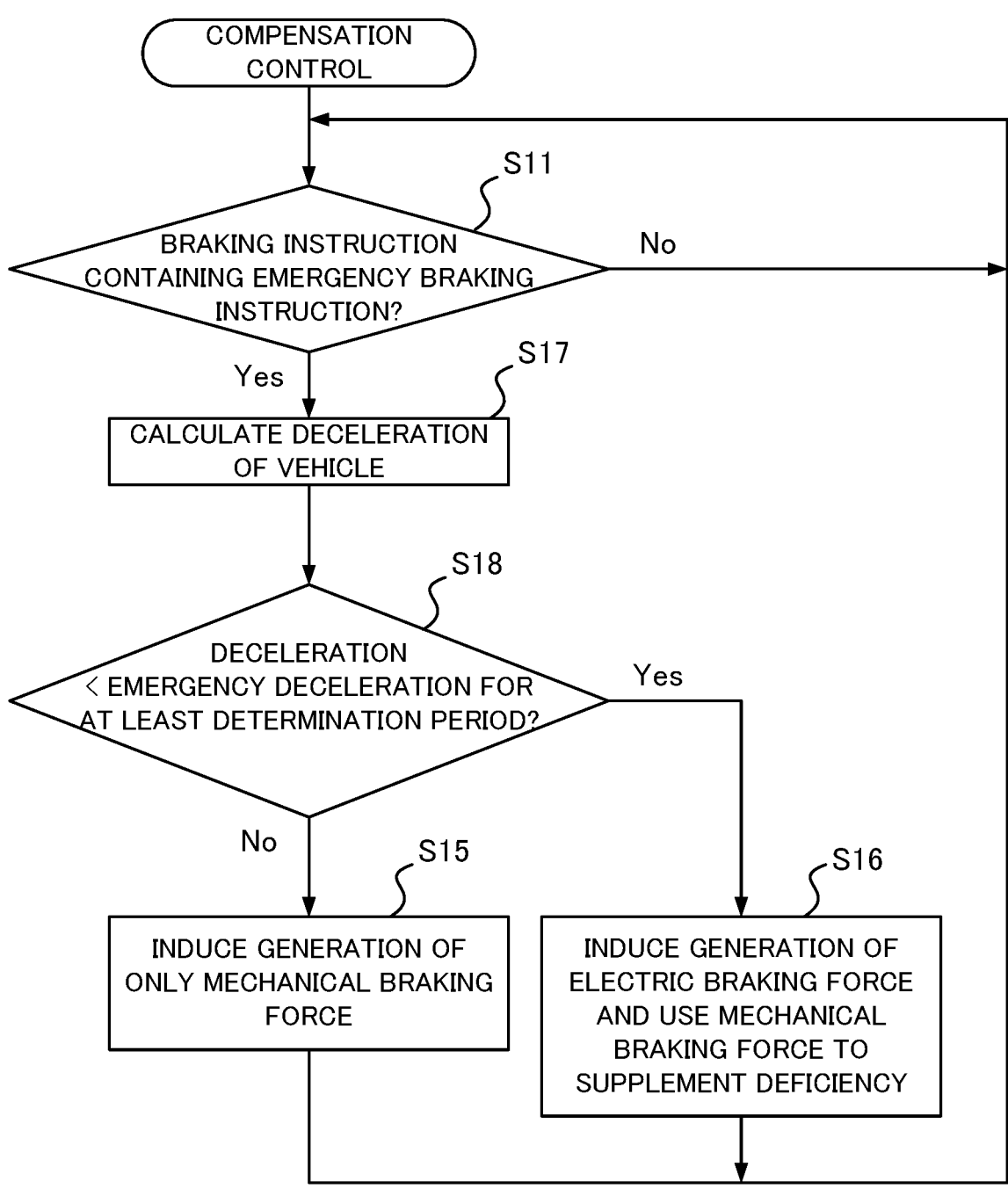
FIG. 9 is a flowchart illustrating exemplary operations of compensation control executed by the brake control apparatus according to Embodiment 3.

The brake control apparatus 3 initiates the processing illustrated in FIG. 9 in response to input of a braking instruction from the brake setter 51. The process in Step S11 is the same as the process executed by the brake control apparatus 1 illustrated in FIG. 3.

When the braking instruction contains an emergency braking instruction (Step S11; Yes), the determiner 24 calculates a deceleration of the vehicle (Step S17). When the deceleration of the vehicle has been smaller than the emergency deceleration for a period shorter than the determination period (Step S18; No), the process goes to Step S15. The process in Step S15 is the same as the process executed by the brake control apparatus 2 illustrated in FIG. 6.

In contrast, when the deceleration of the vehicle has been smaller than the emergency deceleration for at least the determination period (Step S18; Yes), the process goes to Step S16. The process in Step S16 is the same as the process executed by the brake control apparatus 2 illustrated in FIG. 6.

The brake control apparatus 3 having the above-described configuration executes operations of brake control, which is described below with reference to the timing chart in the sections (A) to (G) of FIG. 10. The description of Embodiment 3 assumes that, as illustrated in the section (A) of FIG. 10, no braking instruction has been input from the brake setter 51 to the brake control apparatus 3 until the time T21, and a braking instruction containing an emergency braking instruction is input from the brake setter 51 to the brake control apparatus 3 at the time T21.

Figure 10:
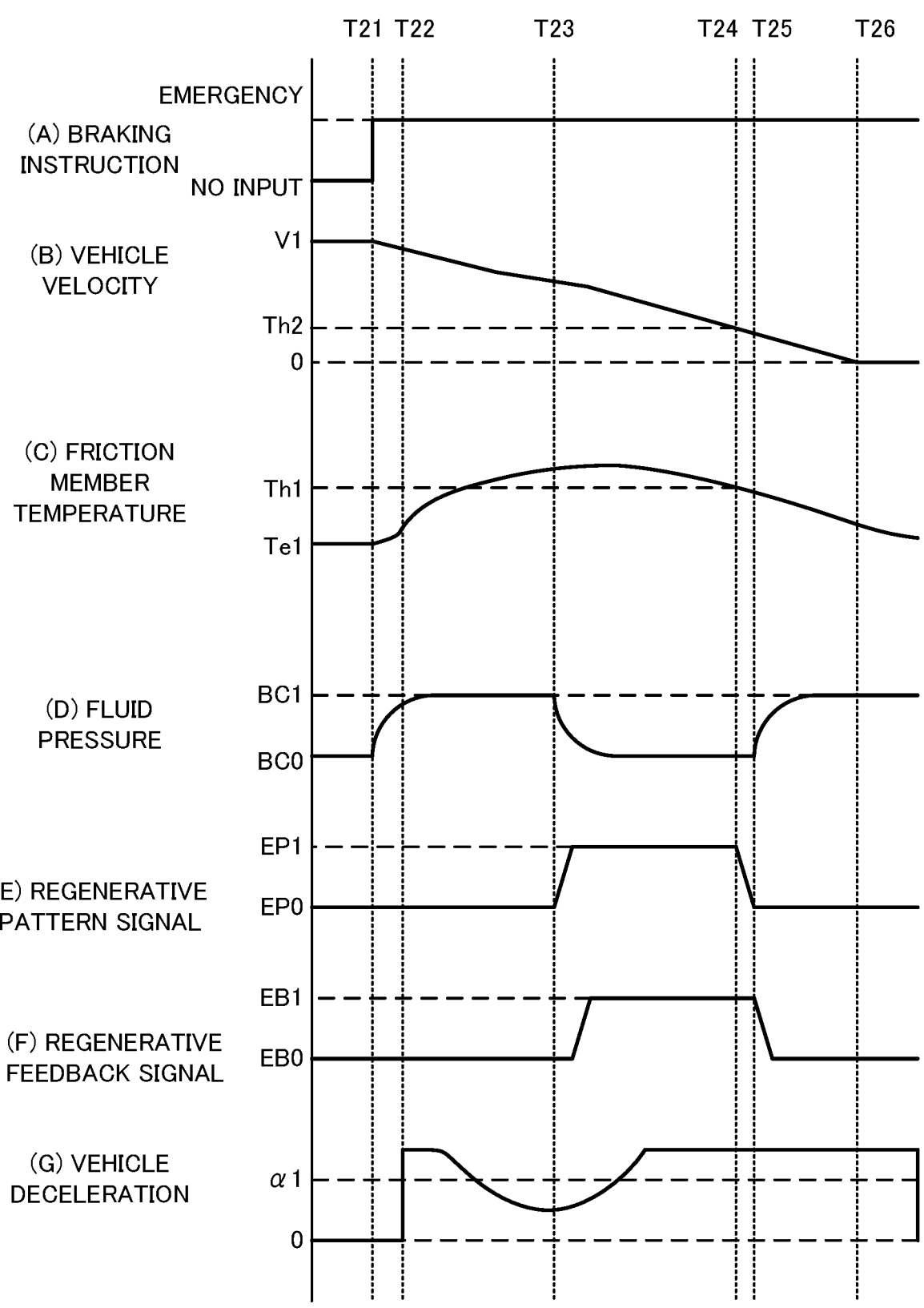
FIG. 10 is a timing chart illustrating exemplary operations of brake control executed by the brake control apparatus according to Embodiment 3, the section (A) illustrates a braking instruction, the section (B) illustrates a velocity of a vehicle, the section (C) illustrates a temperature of a friction member, the section (D) illustrates a pressure of fluid fed to a mechanical brake device, the section (E) illustrates a regenerative pattern signal, the section (F) illustrates a regenerative feedback signal, and the section (G) illustrates a deceleration of the vehicle.

Until the time T21, the velocity of the vehicle has been equal to the velocity V1 as illustrated in the section (B) of FIG. 10, and the temperature of the friction member has been equal to the temperature Te1 as illustrated in the section (C) of FIG. 10. Until the time T21, the pressure of air fed to the mechanical brake device 54 has been equal to the pressure BC0 as illustrated in the section (D) of FIG. 10. No mechanical braking force is generated in the case of the pressure of air inside the brake cylinder equal to the pressure BC0, because of no contact of the friction member with the rotating body.

Since no braking instruction has been input from the brake setter 51 to the brake control apparatus 3 until the time T21, the target electric braking force indicated by the regenerative pattern signal has been equal to the target electric braking force EP0 corresponding to 0, as illustrated in the section (E) of FIG. 10, so that no electric braking force is generated. Accordingly, as illustrated in the section (F) of FIG. 10, the actual electric braking force indicated by the regenerative feedback signal has been equal to the actual electric braking force EB0 corresponding to 0.

As illustrated in the section (A) of FIG. 10, when a braking instruction containing an emergency braking instruction is input from the brake setter 51 to the brake control apparatus 3 at the time T21, the target braking force calculator 11 calculates a target braking force BF, on the basis of the emergency deceleration $\alpha 1$ indicated by the emergency braking instruction and the vehicle weight WT acquired from the load compensating device 52.

The description assumes that the target electric braking force indicated by the regenerative pattern signal has been equal to the target electric braking force EP0 from the time T21 until the time T22 after elapse of the calculation period. The actual electric braking force indicated by the regenerative feedback signal thus has been equal to the actual electric braking force EB0.

The target pressure calculator 12 subtracts the actual electric braking force EB0 from the target braking force BF calculated by the target braking force calculator 11, and thereby calculates a target mechanical braking force MB. The target pressure calculator 12 then calculates a target pressure BC, which is a target value of pressure of fluid to be fed to the mechanical brake device 54, on the basis of the target mechanical braking force MB. When the actual electric braking force is equal to the actual electric braking force EB0, the target pressure calculated by the target pressure calculator 12 is equal to the target pressure BC1 based on the emergency deceleration $\alpha 1$.

The electropneumatic valve 17 adjusts the pressure of air fed from the fluid source 53 in accordance with the target pressure BC1, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. Accordingly, as illustrated in the section (D) of FIG. 10, the pressure of air to be fed to the mechanical brake device 54 increases from the pressure BC0 and then reaches the pressure BC1.

At the time T22, the determiner 24 calculates a deceleration of the vehicle. As illustrated in the section (G) of FIG. 10, the determiner 24 determines that the deceleration of the vehicle is greater than the emergency deceleration α1. The compensator 22 thus calculates the target electric braking force EP0 corresponding to 0 regardless of the target braking force BF, and provides the calculated target electric braking force EP0 to the regenerative brake controller 19.

Because of the braking instruction containing an emergency braking instruction, the regenerative brake controller 19 acquires the target electric braking force EP0 from the compensator 22, and transmits a regenerative pattern signal indicating the acquired target electric braking force EP0 to the power conversion apparatus controller 56. Since the target electric braking force indicated by the regenerative pattern signal is equal to the target electric braking force EP0 as illustrated in the section (E) of FIG. 10 as described above, no regenerative braking force is generated. Accordingly, as illustrated in the section (F) of FIG. 10, the actual electric braking force indicated by the regenerative feedback signal is equal to EB0.

When the mechanical brake device 54 starts the operation at the time T21 and continues the operation, the temperature of the friction member rises as illustrated in the section (C) of FIG. 10. The rise in temperature reduces the friction coefficient and decreases the actual braking force, so that the deceleration of the vehicle falls below the emergency deceleration α1.

As illustrated in the section (G) of FIG. 10, the determiner 24 is assumed to determine, at the time T23, that the deceleration of the vehicle has been smaller than the emergency deceleration α1 for a determination period. The compensator 22 thus calculates a target electric braking force, which is a target value of the electric braking force, on the basis of the target braking force BF calculated by the target braking force calculator 11. The target electric braking force calculated on the basis of this target braking force BF is defined as EP1. The compensator 22 then provides the calculated target electric braking force EP1 to the regenerative brake controller 19.

Because of the braking instruction containing an emergency braking instruction, the regenerative brake controller 19 acquires the target electric braking force EP1 from the compensator 22, and transmits a regenerative pattern signal indicating the acquired target electric braking force EP1 to the power conversion apparatus controller 56. This operation results in generation of a regenerative braking force. In the example illustrated in the section (E) of FIG. 10, the regenerative brake controller 19 gradually changes the value of the regenerative pattern signal.

As illustrated in the section (F) of FIG. 10, the actual electric braking force increases from EB0 to EB1. The actual electric braking force EB1 indicates the actual electric braking force generated in response to control of the power conversion apparatus controller 56 over the power conversion apparatus 57 in accordance with the regenerative pattern signal indicating the target electric braking force EP1. The regenerative brake controller 19 acquires a regenerative feedback signal indicating the actual electric braking force, and provides the actual electric braking force to the target pressure calculator 12.

The target pressure calculator 12 subtracts the actual electric braking force from the target braking force BF, and thereby calculates a target mechanical braking force MB, which is a target value of the mechanical braking force. The target pressure calculator 12 then calculates a target pressure BC on the basis of the target mechanical braking force MB. The example illustrated in FIG. 10 assumes that the actual electric braking force EB1 is at least the target braking force BF. The target pressure BC calculated by the target pressure calculator 12 thus decreases as the actual electric braking force increases from EB0 to EB1, and then reaches the target pressure BC0.

The electropneumatic valve 17 adjusts the pressure of air fed from the fluid source 53 in accordance with the target pressure, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. As illustrated in the section (D) of FIG. 10, the pressure of air fed to the mechanical brake device 54 thus decreases from the pressure BC1 and then reaches the pressure BC0. The mechanical brake device 54 thus stops the operation.

The vehicle decelerates after the time T23. When the vehicle velocity reaches the threshold velocity Th2 at the time T24 as illustrated in the section (B) of FIG. 10, the regenerative brake controller 19 terminates the control for generating an electric braking force. In detail, the regenerative brake controller 19 outputs a regenerative pattern signal indicating the target electric braking force EP0, so that no electric braking force is generated. In the example illustrated in the section (E) of FIG. 10, the regenerative brake controller 19 gradually changes the value of the regenerative pattern signal.

As illustrated in the section (F) of FIG. 10, the actual electric braking force starts to decrease from EB1 at the time T25 and then reaches EB0. The regenerative brake controller 19 acquires a regenerative feedback signal indicating the actual electric braking force, and provides the actual electric braking force to the target pressure calculator 12.

The target pressure calculator 12 subtracts the actual electric braking force from the target braking force BF, and thereby calculates a target mechanical braking force MB, which is a target value of the mechanical braking force. The target pressure calculator 12 then calculates a target pressure BC on the basis of the target mechanical braking force MB. The target pressure calculated by the target pressure calculator 12 in the case of the actual electric braking force EB0 is equal to the pressure BC1. The target pressure BC calculated by the target pressure calculator 12 thus increases as the actual electric braking force decreases from EB1 to EB0, and then reaches the target pressure BC1.

The electropneumatic valve 17 adjusts the pressure of air fed from the fluid source 53 in accordance with the target pressure, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. As illustrated in the section (D) of FIG. 10, the pressure of air fed to the mechanical brake device 54 thus starts to increase from the pressure BC0 at the time T25, and then reaches the pressure BC1. The vehicle then stops at the time T26.

The mechanical brake device 54 is stopping the operation during generation of the electric braking force, and thus allows the friction member to sufficiently cool as illustrated in the section (C) of FIG. 10. Consequently, feeding of the air compressed in accordance with the target pressure BC1 based on the emergency deceleration α1 to the mechanical brake device 54 can achieve generation of a mechanical braking force corresponding to the target braking force.

As described above, the brake control apparatus 3 according to Embodiment 3 induces generation of an electric braking force when the deceleration of the vehicle has been smaller than the emergency deceleration. Since the magnitude of the electric braking force does not vary depending on the temperature of the friction member, unlike the magnitude of a mechanical braking force, the brake control apparatus 3 can achieve a target braking force. In other words, the brake control apparatus 3 compensates for the gap between the actual braking force and the target braking force by using an electric braking force instead of a mechanical braking force, and can therefore suppress a decrease in the actual braking force during emergency brake.

Embodiment 4

The procedure of determining whether compensation is necessary for the gap between the actual braking force and the target braking force is not necessarily a determination procedure based on the temperature of the friction member or a determination procedure based on the deceleration of the vehicle. The description of Embodiment 4 is directed to a brake control apparatus 4 to determine whether compensation is necessary for the gap between the actual braking force and the target braking force in accordance with a braking instruction.

Figure 11:
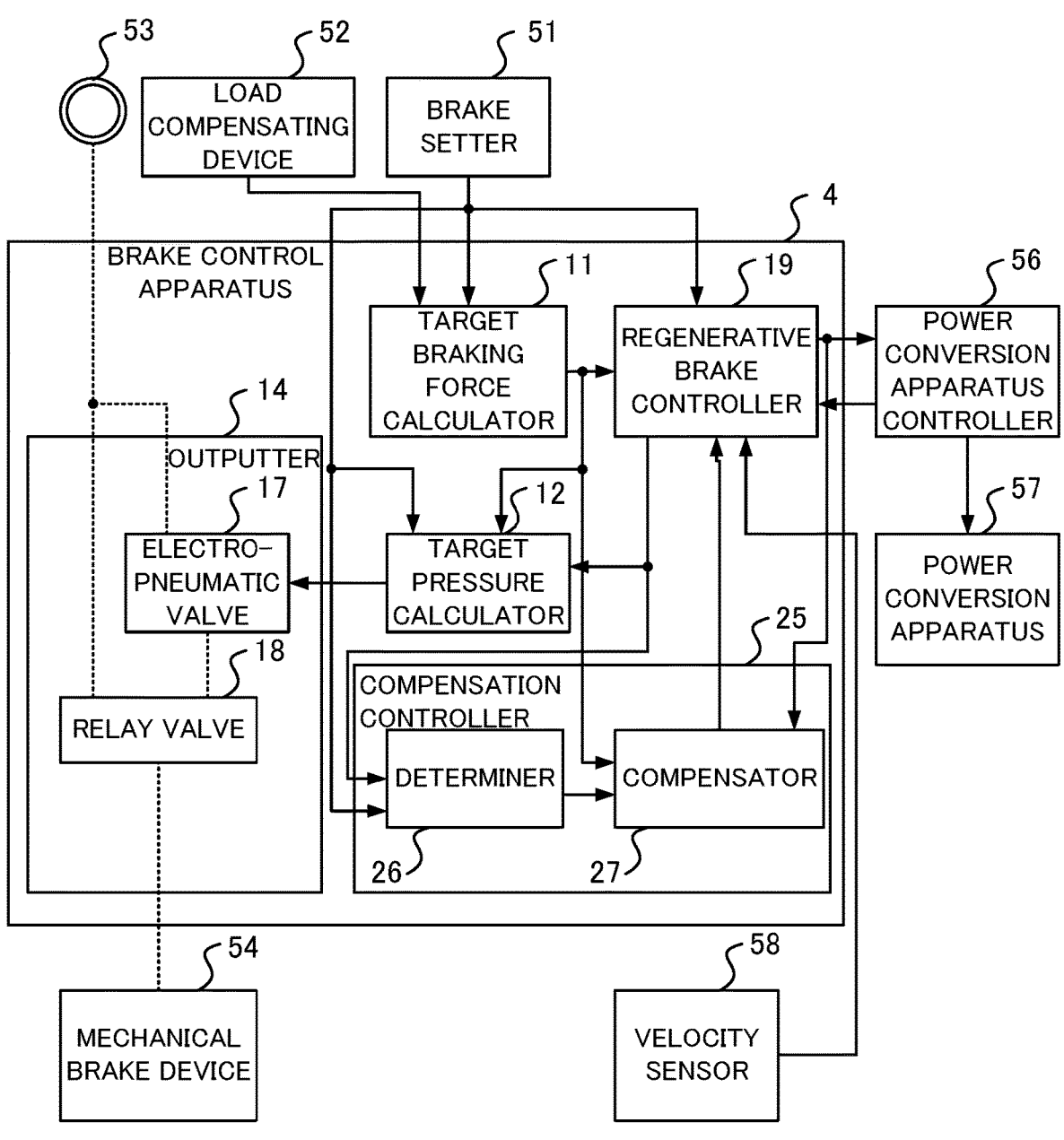
FIG. 11 is a block diagram illustrating a configuration of a brake control apparatus according to Embodiment 4.

The brake control apparatus 4 according to Embodiment 4 illustrated in FIG. 11 includes a compensation controller 25 to execute control for compensating for the gap between the actual braking force and the target braking force when the braking instruction contains an emergency braking instruction. The individual components of the brake control apparatus 4 are described below focusing on the differences from the brake control apparatus 2.

The compensation controller 25 includes a determiner 26 to determine whether compensation is necessary for the gap between the actual braking force and the target braking force in accordance with the braking instruction and the actual electric braking force, and a compensator 27 to compensate for the gap between the actual braking force and the target braking force when the determiner 26 determines that compensation is necessary for the gap between the actual braking force and the target braking force.

The determiner 26 acquires the braking instruction from the brake setter 51, and acquires the actual electric braking force from the regenerative brake controller 19. The determiner 26 then determines whether the status of the braking instruction containing a normal braking instruction accompanied by generation of an electric braking force changes to the status of the braking instruction containing an emergency braking instruction. Since the mechanical brake device 54 needs a start-up time, the actual braking force may decrease at the time of switching from the normal brake control based on an electric braking force to the emergency brake control based on a mechanical braking force.

Thus, in a case in which the status of the braking instruction containing a normal braking instruction accompanied by generation of an electric braking force changes to the status of the braking instruction containing an emergency braking instruction, compensation is deemed necessary for the gap between the actual braking force and the target braking force. For example, the determiner 26 includes a first comparator to compare braking instructions stored in a memory, which is not illustrated, at a certain time interval and determine whether any change occurs in the braking instructions, a second comparator to determine whether the actual electric braking force is greater than 0, and a logic circuit to receive input of a determination result from the first comparator and a determination result from the second comparator.

In a case in which the status of the braking instruction containing a normal braking instruction accompanied by generation of an electric braking force changes to the status of the braking instruction containing an emergency braking instruction, the determiner 26 provides the compensator 27 with the determination result indicating that compensation is necessary for the gap between the actual braking force and the target braking force. In contrast, in a case in which the status of the braking instruction containing a normal braking instruction accompanied by generation of an electric braking force changes to the status of the braking instruction containing an emergency braking instruction, the determiner 26 provides the compensator 27 with the determination result indicating that no compensation is necessary for the gap between the actual braking force and the target braking force.

When the determination result acquired from the determiner 26 indicates that compensation is necessary for the gap between the actual braking force and the target braking force, the compensator 27 gradually decreases the target electric braking force indicated by the regenerative pattern signal recently output from the regenerative brake controller 19, and thereby calculates a new target electric braking force. The compensator 27 then provides the calculated target electric braking force to the regenerative brake controller 19. For example, the compensator 27 includes a subtractor to decrease the target electric braking force in accordance with the output from the logic circuit of the determiner 26.

The target pressure calculator 12 acquires the braking instruction from the brake setter 51, acquires the target braking force BF from the target braking force calculator 11, and acquires the actual electric braking force from each of the regenerative brake controller 19 and the compensator 27. When the braking instruction contains a normal braking instruction, the target pressure calculator 12 subtracts the actual electric braking force from the target braking force BF, and thereby calculates a target mechanical braking force MB, which is a target value of the mechanical braking force. The target pressure calculator 12 then assigns the target mechanical braking force MB to the target braking force BF in the above Expression (2), and thereby calculates a target pressure BC.

In contrast, when the braking instruction contains an emergency braking instruction, the target pressure calculator 12 uses the target braking force BF as the target mechanical braking force MB, which is a target value of the mechanical braking force. The target pressure calculator 12 then assigns the target mechanical braking force MB to the target braking force BF in the above Expression (2), and thereby calculates a target pressure BC.

The brake control apparatus 4 has the hardware configuration that is the same as that in Embodiment 1, except for that the brake control apparatus 4 communicates with the brake setter 51, the load compensating device 52, the power conversion apparatus controller 56, and the velocity sensor 58 via the interface 83.

A summary of operations of compensation control executed by the brake control apparatus 4 having the above-described configuration is described below with reference to FIG. 12.

Figure 12:
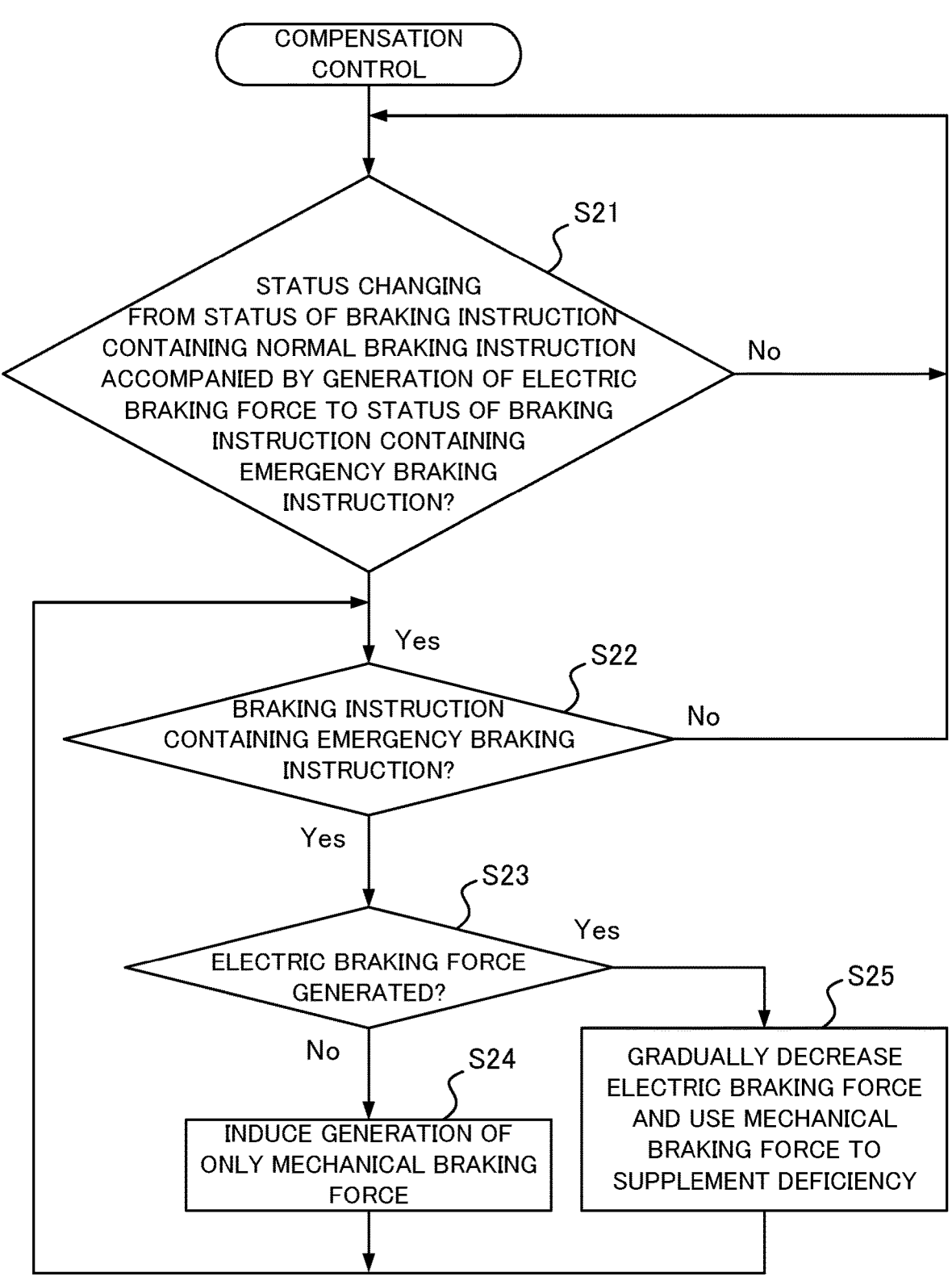
FIG. 12 is a flowchart illustrating exemplary operations of compensation control executed by the brake control apparatus according to Embodiment 4.

The brake control apparatus 4 initiates the processing illustrated in FIG. 12 in response to a change in the braking instruction input from the brake setter 51. In a case in which the status of the braking instruction containing a normal braking instruction accompanied by generation of an electric braking force does not change to the status of the braking instruction containing an emergency braking instruction (Step S21; No), the target braking force calculator 11 of the brake control apparatus 4 repeats the process in Step S21.

In contrast, in a case in which the status of the braking instruction containing a normal braking instruction accompanied by generation of an electric braking force changes to the status of the braking instruction containing an emergency braking instruction (Step S21; Yes), and while the emergency braking instruction is being input (Step S22; Yes), the brake control apparatus 4 executes the processing in Step S23 and the following steps.

In detail, when no electric braking force is generated (Step S23; No), which means that the target mechanical braking force is equal to the target braking force, the outputter 14 is provided with the target pressure based on the emergency deceleration. The outputter 14 then compresses the air fed from the fluid source 53 in accordance with the target pressure, and feeds the compressed air to the mechanical brake device 54. The brake control apparatus 4 accordingly induces generation of only a mechanical braking force (Step S24).

In contrast, when an electric braking force is generated (Step S23; Yes), the compensator 22 provides the regenerative brake controller 19 with the new target electric braking force calculated by gradually decreasing the target electric braking force indicated by the regenerative pattern signal recently output from the regenerative brake controller 19. The outputter 14 is thus provided with the target pressure calculated by the target pressure calculator 12 on the basis of the target mechanical braking force, which is obtained by subtracting the actual electric braking force from the target braking force calculated by the target braking force calculator 11 on the basis of the emergency deceleration. The outputter 14 compresses the air fed from the fluid source 53 in accordance with the target pressure, and feeds the compressed air to the mechanical brake device 54. The brake control apparatus 4 thus gradually decreases the electric braking force, and uses the mechanical braking force to supplement the deficiency (Step S25).

After completion of the process in Step S24 or S25, the brake control apparatus 4 executes the process in Step S22 again. While the emergency braking instruction is being input (Step S22; Yes), the brake control apparatus 4 repeats the processing in Step S23 and the following steps as described above. When no emergency braking instruction is input (Step S22; No), the brake control apparatus 4 executes the process in Step S21 again.

The brake control apparatus 4 having the above-described configuration executes operations of brake control, which is described below with reference to the timing chart in the sections (A) to (E) of FIG. 13. The description of Embodiment 4 assumes that, as illustrated in the section (A) of FIG. 13, a braking instruction containing a normal braking instruction has been input from the brake setter 51 to the brake control apparatus 4 until the time T31. The description also assumes that a braking instruction containing an emergency braking instruction is input from the brake setter 51 to the brake control apparatus 4 at the time T31.

Figure 13:
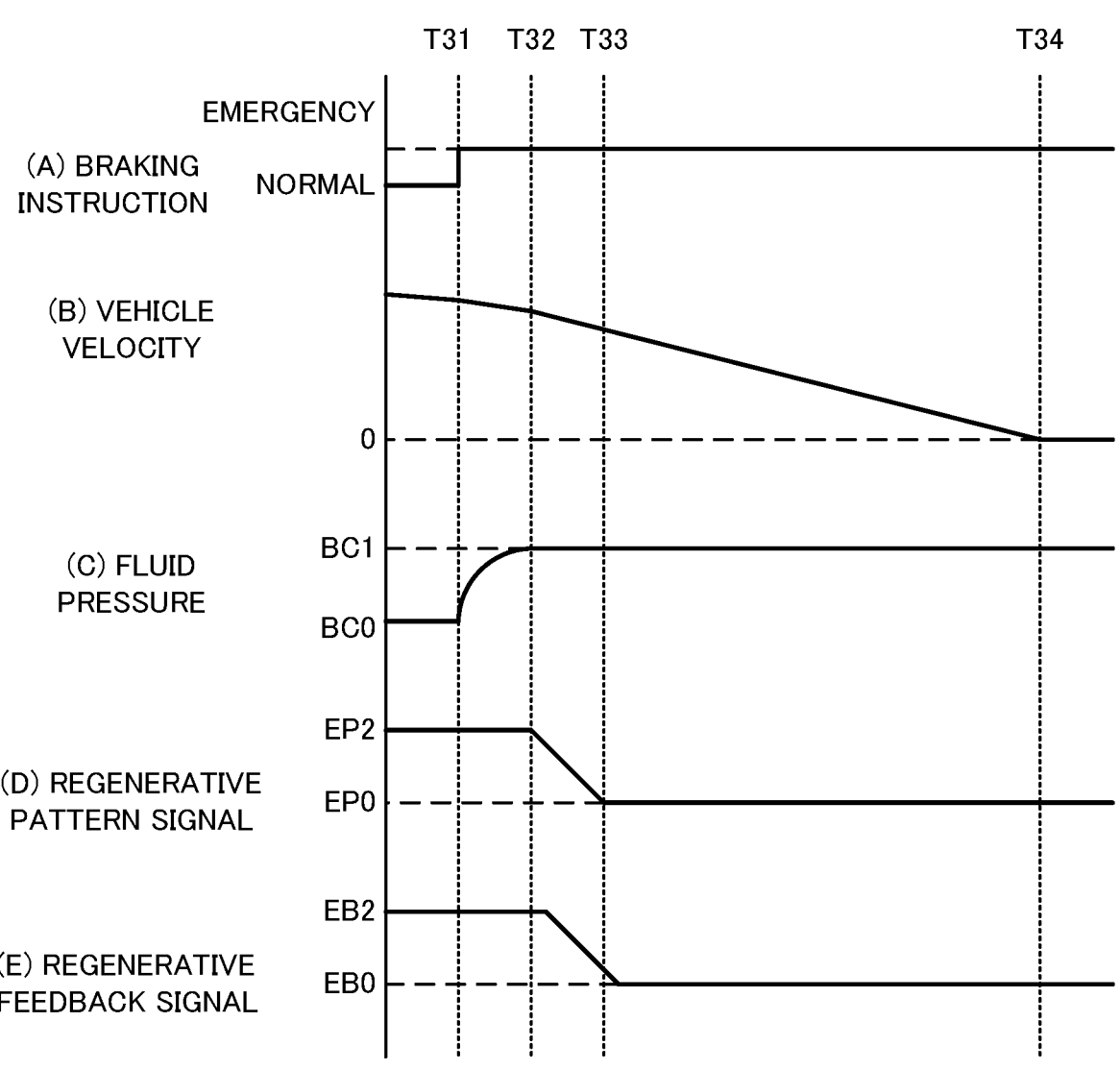
FIG. 13 is a timing chart illustrating exemplary operations of brake control executed by the brake control apparatus according to Embodiment 4, the section (A) illustrates a braking instruction, the section (B) illustrates a velocity of a vehicle, the section (C) illustrates a pressure of fluid fed to a mechanical brake device, the section (D) illustrates a regenerative pattern signal, and the section (E) illustrates a regenerative feedback signal.

As illustrated in the section (A) of FIG. 13, a braking instruction containing a normal braking instruction has been input until the time T31. The target braking force calculator 11 calculates a target braking force BF' using the above Expression (1), on the basis of the normal deceleration α2 indicated by the normal braking instruction and the vehicle weight WT acquired from the load compensating device 52. Because of the braking instruction containing a normal braking instruction, the regenerative brake controller 19 calculates a target electric braking force on the basis of the target braking force BF'. The target electric braking force calculated in accordance with the target braking force BF' based on the normal deceleration α2 is defined as EP2. The regenerative brake controller 19 then transmits a regenerative pattern signal indicating the calculated target electric braking force EP2 to the power conversion apparatus controller 56. This operation results in generation of an electric braking force.

The actual electric braking force EB2 is thus generated, as illustrated in the section (E) of FIG. 13. The actual electric braking force EB2 indicates the actual electric braking force generated in response to control of the power conversion apparatus controller 56 over the power conversion apparatus 57 in accordance with the regenerative pattern signal indicating the target electric braking force EP2. The regenerative brake controller 19 acquires a regenerative feedback signal indicating the actual electric braking force, and provides the actual electric braking force to the target pressure calculator 12.

The target pressure calculator 12 subtracts the actual electric braking force EB2 from the target braking force BF, and thereby calculates a target mechanical braking force MB, which is a target value of the mechanical braking force. The target pressure calculator 12 then calculates a target pressure BC on the basis of the target mechanical braking force MB. The example illustrated in FIG. 13 assumes that the actual electric braking force EB2 is at least the target braking force BF. The target pressure BC calculated by the target pressure calculator 12 is accordingly maintained at the target pressure BC0.

The electropneumatic valve 17 adjusts the pressure of air fed from the fluid source 53 in accordance with the target pressure BC0, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. The pressure of air to be fed to the mechanical brake device 54 is thus maintained at the pressure BC0, as illustrated in the section (C) of FIG. 13. No mechanical braking force is generated in the case of the pressure of air inside the brake cylinder equal to the pressure BC0, because of no contact of the friction member with the rotating body.

When the braking instruction containing an emergency braking instruction is input from the brake setter 51 at the time T31, the target braking force calculator 11 calculates a target braking force BF on the basis of the emergency deceleration α1 indicated by the emergency braking instruction and the vehicle weight WT acquired from the load compensating device 52.

As illustrated in the sections (A) and (E) of FIG. 13, the determiner 26 determines, at the time T31, that the status of the braking instruction containing a normal braking instruction accompanied by generation of an electric braking force changes to the status of the braking instruction containing an emergency braking instruction. The compensator 27 thus gradually decreases the target electric braking force indicated by the regenerative pattern signal recently output from the regenerative brake controller 19 and thereby calculates a new target electric braking force, and provides the calculated target electric braking force to the regenerative brake controller 19. In the example illustrated in FIG. 13, the compensator 27 has provided the latest target electric braking force to the regenerative brake controller 19 from the time T31 to the time T32.

Because of the braking instruction containing an emergency braking instruction, the regenerative brake controller 19 acquires the target electric braking force EP2 from the compensator 27, and transmits a regenerative pattern signal indicating the acquired target electric braking force EP2 to the power conversion apparatus controller 56. Since the compensator 27 has provided the latest target electric braking force EP2 to the regenerative brake controller 19 from the time T31 to the time T32 as described above, the target electric braking force has been maintained at the target electric braking force EP2 from the time T31 to the time T32 as illustrated in the section (D) of FIG. 13. The actual electric braking force has been accordingly maintained at the actual electric braking force EB2 as illustrated in the section (E) of FIG. 13.

At the time T31, the target pressure calculator 12 uses the target braking force BF calculated by the target braking force calculator 11 as the target mechanical braking force MB, which is a target value of the mechanical braking force. The target pressure calculator 12 then calculates a target pressure BC1 on the basis of the target mechanical braking force MB.

The electropneumatic valve 17 adjusts the pressure of air fed from the fluid source 53 in accordance with the target pressure BC1, and feeds the air having the adjusted pressure to the relay valve 18. The relay valve 18 compresses the air fed from the fluid source 53 in accordance with the designated pressure, which is the pressure of air output from the electropneumatic valve 17, and feeds the compressed air to the mechanical brake device 54. Accordingly, as illustrated in the section (C) of FIG. 13, the pressure of air fed to the mechanical brake device 54 increases from the pressure BC0 and then reaches the pressure BC1. The vehicle then stops at the time T34.

After the time T32, the compensator 27 decreases the latest target electric braking force by a certain amount and calculates a new target electric braking force, and provides the calculated target electric braking force to the regenerative brake controller 19. The certain amount is preliminarily defined depending on the start-up time of the mechanical brake device 54.

Because of the braking instruction containing an emergency braking instruction, the regenerative brake controller 19 acquires the target electric braking force from the compensator 27, and transmits a regenerative pattern signal indicating the acquired target electric braking force to the power conversion apparatus controller 56. Accordingly, as illustrated in the section (D) of FIG. 13, the target electric braking force starts to gradually decrease at the time T32 from the target electric braking force EP2, and then reaches the target electric braking force EP0. The actual electric braking force thus gradually decreases from the actual electric braking force EB2 and reaches the actual electric braking force EB0, as illustrated in the section (E) of FIG. 13, so that no electric braking force is generated.

As described above, in a case in which the status of the braking instruction containing a normal braking instruction accompanied by generation of an electric braking force changes to the status of the braking instruction containing an emergency braking instruction, the brake control apparatus 4 according to Embodiment 4 activates the mechanical brake device 54 while gradually decreasing the electric braking force. The brake control apparatus 4 continues generation of an electric braking force during the start-up time of the mechanical brake device 54 and thereby compensates for the gap between the actual braking force and the target braking force, and can therefore suppress a decrease in the actual braking force during emergency brake.

The above-described embodiments are not to be construed as limiting the scope of the present disclosure. Some of the embodiments may be arbitrarily combined with each other. The above-described hardware configurations and flowcharts are mere examples and may be arbitrarily changed and modified.

For example, the brake control apparatus 1 may determine whether compensation is necessary for the gap between the actual braking force and the target braking force on the basis of the deceleration of the vehicle, like the brake control apparatus 3. The brake control apparatus 1 may determine that compensation is necessary for the gap between the actual braking force and the target braking force, when the braking instruction changes from the normal braking instruction to the emergency braking instruction, like the brake control apparatus 4.

For another example, the brake control apparatus 3 may determine whether compensation is necessary for the gap between the actual braking force and the target braking force on the basis of the temperature of the friction member and the deceleration of the vehicle. In detail, the brake control apparatus 3 may determine that compensation is necessary for the gap between the actual braking force and the target braking force, when the temperature of the friction member is at least the threshold temperature, or when the deceleration of the vehicle is smaller than a threshold deceleration.

For another example, when the temperature of the friction member is at least the threshold temperature after restart of the mechanical brake device 54, the brake control apparatus 2 may increase the target pressure and induce generation of a mechanical braking force in accordance with the increased target pressure.

Figure 14:
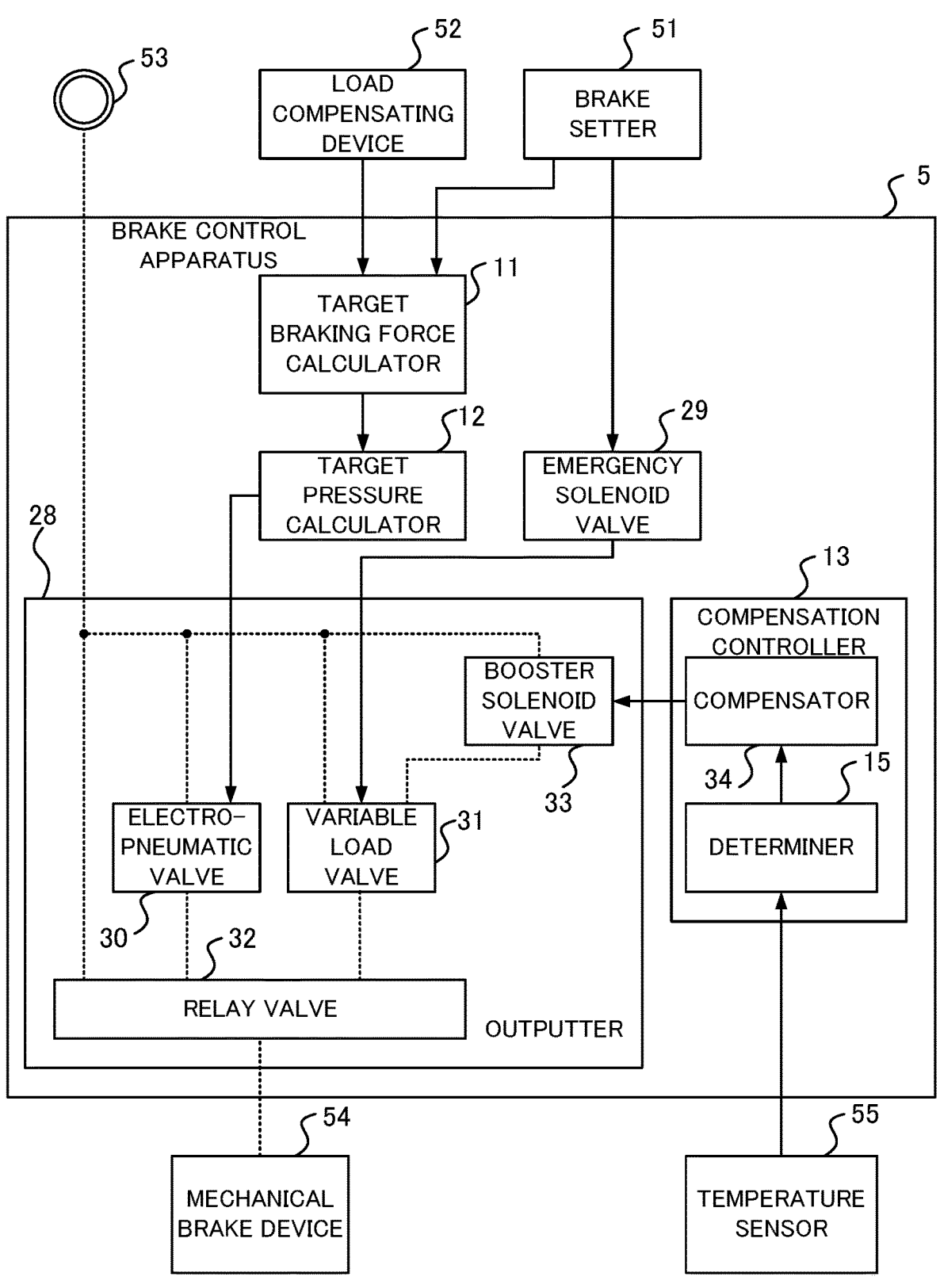
FIG. 14 is a block diagram illustrating a configuration of a brake control apparatus according to a modification of the embodiments.

Although the brake control apparatus 1 includes the electropneumatic valve 17 that provides a designated pressure both during normal brake and during emergency brake, the brake control apparatus 1 may include a solenoid valve for normal brake and a solenoid valve for emergency brake. A brake control apparatus 5 illustrated in FIG. 14 includes a solenoid valve for normal brake and a solenoid valve for emergency brake. The brake control apparatus 5 also includes an outputter 28 to compress the air fed from the fluid source 53 for achieving a target braking force in accordance with the normal deceleration indicated by the normal braking instruction or the emergency deceleration indicated by the emergency braking instruction, and feed the compressed air to the mechanical brake device 54. The brake control apparatus 5 further includes an emergency solenoid valve 29 to activate a variable load valve 31, which serves as the solenoid valve for emergency brake included in the outputter 28, when an emergency braking instruction is input from the brake setter 51.

The individual components of the brake control apparatus 5 are described in detail below.

When the braking instruction acquired from the brake setter 51 contains a normal braking instruction, the target braking force calculator 11 calculates a target braking force BF, on the basis of the normal deceleration α2 indicated by the normal braking instruction and the vehicle weight WT acquired from the load compensating device 52.

The target pressure calculator 12 calculates a target pressure BC, which is a target value of pressure of air to be fed to the brake cylinder of the mechanical brake device 54, in accordance with the target braking force BF calculated by the target braking force calculator 11. In other words, the target pressure BC is a target pressure based on the normal deceleration α2.

The outputter 28 includes an electropneumatic valve 30 to adjust the pressure of air fed from the fluid source 53 in accordance with the target pressure BC calculated by the target pressure calculator 12 and output the air having the adjusted pressure, and the variable load valve 31 to compress the air fed from the fluid source 53 to a predetermined pressure and output the compressed air. The electropneumatic valve 30 serves as the solenoid valve for normal brake. The outputter 28 further includes a relay valve 32 to compress the air fed from the fluid source 53 in accordance with a designated pressure, which is the higher one of the pressure of air output from the electropneumatic valve 30 and the pressure of air output from the variable load valve 31, and feed the compressed air to the mechanical brake device 54, and a booster solenoid valve 33 to compress the air fed from the fluid source 53, feed the compressed air to the variable load valve 31, and thereby boost the pressure of air to be output from the variable load valve 31.

When a braking instruction containing an emergency braking instruction is input from the brake setter 51 to the emergency solenoid valve 29, the emergency solenoid valve 29 is demagnetized to open the flow path for the air compressed by the variable load valve 31. The air compressed by the variable load valve 31 is accordingly fed to the relay valve 32.

When the determiner 15 determines that compensation is necessary for the gap between the actual braking force and the target braking force, a compensator 34 of the compensation controller 13 included in the brake control apparatus 5 excites the booster solenoid valve 33. The excitation of the booster solenoid valve 33 opens the flow path for the air compressed by the booster solenoid valve 33. The air compressed by the booster solenoid valve 33 is accordingly fed to the variable load valve 31, thereby increasing the pressure of air to be output from the variable load valve 31. In other words, the mechanical braking force to be generated by the mechanical brake device 54 can be increased, when the determiner 15 determines that compensation is necessary for the gap between the actual braking force and the target braking force.

The brake control apparatuses 2 to 4 may also include both of the solenoid valve for normal brake and the solenoid valve for emergency brake.

The brake control apparatuses 1 and 2 may acquire the temperature of the friction member from a temperature estimator for estimating the temperature of the friction member, instead of from the temperature sensor 55 for measuring the temperature of the friction member. The temperature estimator estimates the temperature of the friction member from an integrated value of the target pressures BC or an integrated value of the pressures measured by a cylinder-pressure sensor for measuring a pressure of air output from the relay valve 18, for example.

The regenerative brake controller 19 may acquire the velocity of the vehicle from an in-vehicle system or an automatic train control (ATC) system.

The regenerative brake controller 19 may determine whether to terminate the control for generating an electric braking force, on the basis of the target electric braking force and the actual electric braking force, instead of the velocity acquired from the velocity sensor 58. In detail, the regenerative brake controller 19 may determine occurrence of a regeneration failure and stop the control for generating an electric braking force, when the actual electric braking force is smaller than the target electric braking force. After the stop of the control for generating an electric braking force, the vehicle stops by receiving only a mechanical braking force generated by the mechanical brake device 54.

The determiner 24 may calculate a deceleration of the vehicle by any procedure other than the above-described example. For example, the determiner 24 may acquire the deceleration of the vehicle from an acceleration sensor. For another example, the determiner 24 may calculate a deceleration of the vehicle on the basis of the velocity of the vehicle acquired from an in-vehicle system or an ATC system.

Although the above-described embodiments are directed to the compensation control for compensating for the gap between the actual braking force and the target braking force during emergency brake, the compensation control for compensating for the gap between the actual braking force and the target braking force may also be executed during normal brake. Alternatively, the target pressure calculator 12 may acquire the pressure measured by the cylinder-pressure sensor for measuring the pressure of air output from the relay valve 18, and execute feedback control on the basis of the measured pressure. The feedback control allows the actual braking force to approach the target braking force.

The fluid used to activate the mechanical brake device 54 is not necessarily air and may also be oil, for example.

The electric braking force is not necessarily a braking force generated in regeneration control. For example, the electric power generated by the motor functioning as an electric generator and converted by the power conversion apparatus 57 may be consumed through discharge at a discharging resistor, thereby generating an electric braking force.

At least some of the functions of the brake control apparatuses 1 to 5 may be performed as a function of an in-vehicle system. For example, a train control and monitoring system (TCMS) responsible for operations, such as vehicle control, monitoring of in-vehicle devices, and communication with ground equipment, may perform the functions of the target braking force calculator 11, the target pressure calculator 12, and the compensation controller 13.

The brake control apparatuses 1 to 5 may be installed in any moving body, such as railway vehicle driven by an internal combustion engine, automobile, marine vessel, or aircraft, other than the electric railway vehicles.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5 Brake control apparatus
11 Target braking force calculator
12 Target pressure calculator
13, 20, 23, 25 Compensation controller

14, 28 Outputter
15, 21, 24, 26 Determiner
16, 22, 27, 34 Compensator
17, 30 Electropneumatic valve
18, 32 Relay valve
19 Regenerative brake controller
29 Emergency solenoid valve
31 Variable load valve
33 Booster solenoid valve
51 Brake setter
52 Load compensating device
53 Fluid source
54 Mechanical brake device
55 Temperature sensor
56 Power conversion apparatus controller
57 Power conversion apparatus
58 Velocity sensor
80 Bus
81 Processor
82 Memory
83 Interface

The invention claimed is:

1. A brake control system comprising:
target braking force calculating circuitry to calculate a target braking force for causing a railway vehicle to decelerate in accordance with a braking instruction containing a normal braking instruction or an emergency braking instruction, the normal braking instruction designating a normal deceleration indicating a target value of deceleration of the railway vehicle, the emergency braking instruction designating an emergency deceleration indicating a target value of deceleration of the railway vehicle greater than a maximum value of the normal deceleration;
target pressure calculating circuitry to calculate a target pressure based on the target braking force, the target pressure indicating a target value of pressure of fluid to be fed to a mechanical brake device in order to activate the mechanical brake device, the mechanical brake device being configured to press a friction member against a rotating body and thereby cause the railway vehicle to decelerate, the friction member being configured to move depending on a pressure of the fed fluid, the rotating body being configured to rotate during running of the railway vehicle;
an output valve to compress fluid fed from a fluid source in accordance with the target pressure and feed the compressed fluid to the mechanical brake device; and
compensation controlling circuitry to execute control for compensating for a gap between an actual braking force and the target braking force by adjusting the target pressure when the braking instruction contains the emergency braking instruction, the actual braking force indicating an existing braking force generated in the railway vehicle, wherein the control for compensating for the gap is not executed when the braking instruction does not contain the emergency braking instruction.

2. The brake control system according to claim 1, wherein the compensation controlling circuitry comprises
determining circuitry to determine whether compensation is necessary for the gap between the actual braking force and the target braking force, and
compensating circuitry to compensate for the gap between the actual braking force and the target braking force, when the determining circuitry determines that compensation is necessary for the gap between the actual braking force and the target braking force.

3. The brake control system according to claim 2, wherein the determining circuitry determines whether compensation is necessary for the gap between the actual braking force and the target braking force based on a temperature of the friction member included in the mechanical brake device.

4. The brake control system according to claim 2, wherein the determining circuitry acquires a deceleration of the railway vehicle, and determines whether compensation is necessary for the gap between the actual braking force and the target braking force based on the acquired deceleration of the railway vehicle and the emergency deceleration.

5. The brake control system according to claim 3, wherein the determining circuitry acquires a deceleration of the railway vehicle, and determines whether compensation is necessary for the gap between the actual braking force and the target braking force based on the acquired deceleration of the railway vehicle and the emergency deceleration.

6. The brake control system according to claim 2, wherein
when the determining circuitry determines that compensation is necessary for the gap between the actual braking force and the target braking force, the compensating circuitry adjusts the target pressure calculated by the target pressure calculating circuitry, and
when the determining circuitry determines that compensation is necessary for the gap between the actual braking force and the target braking force, the output valve compresses the fluid fed from the fluid source in accordance with the target pressure adjusted by the compensating circuitry, and feeds the compressed fluid to the mechanical brake device.

7. The brake control system according to claim 3, wherein
when the determining circuitry determines that compensation is necessary for the gap between the actual braking force and the target braking force, the compensating circuitry adjusts the target pressure calculated by the target pressure calculating circuitry, and
when the determining circuitry determines that compensation is necessary for the gap between the actual braking force and the target braking force, the output valve compresses the fluid fed from the fluid source in accordance with the target pressure adjusted by the compensating circuitry, and feeds the compressed fluid to the mechanical brake device.

8. The brake control system according to claim 4, wherein
when the determining circuitry determines that compensation is necessary for the gap between the actual braking force and the target braking force, the compensating circuitry adjusts the target pressure calculated by the target pressure calculating circuitry, and
when the determining circuitry determines that compensation is necessary for the gap between the actual braking force and the target braking force, the output valve compresses the fluid fed from the fluid source in accordance with the target pressure adjusted by the compensating circuitry, and feeds the compressed fluid to the mechanical brake device.

9. The brake control system according to claim 5, wherein
when the determining circuitry determines that compensation is necessary for the gap between the actual braking force and the target braking force, the compensating circuitry adjusts the target pressure calculated by the target pressure calculating circuitry, and
when the determining circuitry determines that compensation is necessary for the gap between the actual braking force and the target braking force, the output valve compresses the fluid fed from the fluid source in accordance with the target pressure adjusted by the compensating circuitry, and feeds the compressed fluid to the mechanical brake device.

10. The brake control system according to claim 2, wherein the railway vehicle accelerates by receiving a driving force from a motor, the motor being configured to rotate in response to feeding of electric power fed from a power source and converted by a power conversion apparatus, and decelerates by receiving at least either of an electric braking force and a mechanical braking force generated by the mechanical brake device, the electric braking force being generated by consumption of electric power, the electric power fed from the motor functioning as an electric generator and converted by the power conversion apparatus, the brake control system further comprises regenerative brake controlling circuitry, the regenerative brake controlling circuitry being configured to calculate a target electric braking force indicating a target value of the electric braking force based on the target braking force, transmit the target electric braking force to power conversion apparatus controlling circuitry and thereby induce generation of the electric braking force, the power conversion apparatus controlling circuitry being configured to control the power conversion apparatus in accordance with the target electric braking force, and acquire, from the power conversion apparatus controlling circuitry, an actual electric braking force indicating an existing electric braking force, and the target pressure calculating circuitry subtracts the actual electric braking force from the target braking force, and thereby calculates a target mechanical braking force indicating a target value of the mechanical brake force, and calculates the target pressure based on the target mechanical braking force.

11. The brake control system according to claim 3, wherein the railway vehicle accelerates by receiving a driving force from a motor, the motor being configured to rotate in response to feeding of electric power fed from a power source and converted by a power conversion apparatus, and decelerates by receiving at least either of an electric braking force and a mechanical braking force generated by the mechanical brake device, the electric braking force being generated by consumption of electric power, the electric power fed from the motor functioning as an electric generator and converted by the power conversion apparatus, the brake control system further comprises regenerative brake controlling circuitry, the regenerative brake controlling circuitry being configured to calculate a target electric braking force indicating a target value of the electric braking force based on the target braking force, transmit the target electric braking force to power conversion apparatus controlling circuitry and thereby induce generation of the electric braking force, the power conversion apparatus controlling circuitry being configured to control the power conversion apparatus in accordance with the target electric braking force, and acquire, from the power conversion apparatus controlling circuitry, an actual electric braking force indicating an existing electric braking force, and the target pressure calculating circuitry subtracts the actual electric braking force from the target braking force, and thereby calculates a target mechanical braking force indicating a target value of the mechanical brake force, and calculates the target pressure based on the target mechanical braking force.

12. The brake control system according to claim 4, wherein the railway vehicle accelerates by receiving a driving force from a motor, the motor being configured to rotate in response to feeding of electric power fed from a power source and converted by a power conversion apparatus, and decelerates by receiving at least either of an electric braking force and a mechanical braking force generated by the mechanical brake device, the electric braking force being generated by consumption of electric power, the electric power fed from the motor functioning as an electric generator and converted by the power conversion apparatus, the brake control system further comprises regenerative brake controlling circuitry, the regenerative brake controlling circuitry being configured to calculate a target electric braking force indicating a target value of the electric braking force based on the target braking force, transmit the target electric braking force to power conversion apparatus controlling circuitry and thereby induce generation of the electric braking force, the power conversion apparatus controlling circuitry being configured to control the power conversion apparatus in accordance with the target electric braking force, and acquire, from the power conversion apparatus controlling circuitry, an actual electric braking force indicating an existing electric braking force, and the target pressure calculating circuitry subtracts the actual electric braking force from the target braking force, and thereby calculates a target mechanical braking force indicating a target value of the mechanical brake force, and calculates the target pressure based on the target mechanical braking force.

13. The brake control system according to claim 6, wherein the railway vehicle accelerates by receiving a driving force from a motor, the motor being configured to rotate in response to feeding of electric power fed from a power source and converted by a power conversion apparatus, and decelerates by receiving at least either of an electric braking force and a mechanical braking force generated by the mechanical brake device, the electric braking force being generated by consumption of electric power, the electric power fed from the motor functioning as an electric generator and converted by the power conversion apparatus, the brake control system further comprises regenerative brake controlling circuitry, the regenerative brake controlling circuitry being configured to calculate a target electric braking force indicating a target value of the electric braking force based on the target braking force, transmit the target electric braking force to power conversion apparatus controlling circuitry and thereby induce generation of the electric braking force, the power conversion apparatus controlling circuitry being configured to control the power conversion apparatus in accordance with the target electric braking force, and acquire, from the power conversion apparatus controlling circuitry, an actual electric braking force indicating an existing electric braking force, and the target pressure calculating circuitry subtracts the actual electric braking force from the target braking force, and thereby calculates a target mechanical braking force indicating a target value of the mechanical brake force, and calculates the target pressure based on the target mechanical braking force.

14. The brake control system according to claim 11, wherein the compensating circuitry calculates a target electric braking force based on the target braking force, when the determining circuitry determines that compensation is necessary for the gap between the actual braking force and the target braking force, and determines the target electric braking force to be 0 regardless of the target braking force, when the determining circuitry determines that no compensation is necessary for the gap between the actual braking force and the target braking force, and when the braking instruction contains the emergency braking instruction, the regenerative brake controlling circuitry transmits the target electric braking force calculated by the compensating circuitry to the power conversion apparatus controlling circuitry.

15. The brake control system according to claim 10, wherein the compensating circuitry calculates a target electric braking force based on the target braking force, when the determining circuitry determines that compensation is necessary for the gap between the actual braking force and the target braking force, and determines the target electric braking force to be 0 regardless of the target braking force, when the determining circuitry determines that no compensation is necessary for the gap between the actual braking force and the target braking force, and when the braking instruction contains the emergency braking instruction, the regenerative brake controlling circuitry transmits the target electric braking force calculated by the compensating circuitry to the power conversion apparatus controlling circuitry.

16. The brake control system according to claim 10, wherein the determining circuitry determines that compensation is necessary for the gap between the actual braking force and the target braking force, in a case in which a status of the braking instruction containing the normal braking instruction accompanied by generation of an electric braking force changes to a status of the braking instruction containing the emergency braking instruction, when the determining circuitry determines that compensation is necessary for the gap between the actual braking force and the target braking force, the compensating circuitry gradually decreases the target electric braking force, and determines the actual electric braking force to be 0, when the determining circuitry determines that compensation is necessary for the gap between the actual braking force and the target braking force, the regenerative brake controlling circuitry transmits the target electric braking force calculated by the compensating circuitry to the power conversion apparatus controlling circuitry, and when the determining circuitry determines that compensation is necessary for the gap between the actual braking force and the target braking force, the target pressure calculating circuitry subtracts the actual electric braking force calculated by the compensating circuitry from the target braking force, and thereby calculates the target mechanical braking force indicating a target value of the mechanical brake force, and calculates the target pressure based on the target mechanical braking force.

17. The brake control system according to claim 11, wherein the determining circuitry determines that compensation is necessary for the gap between the actual braking force and the target braking force, in a case in which a status of the braking instruction containing the normal braking instruction accompanied by generation of an electric braking force changes to a status of the braking instruction containing the emergency braking instruction, when the determining circuitry determines that compensation is necessary for the gap between the actual braking force and the target braking force, the compensating circuitry gradually decreases the target electric braking force, and determines the actual electric braking force to be 0, when the determining circuitry determines that compensation is necessary for the gap between the actual braking force and the target braking force, the regenerative brake controlling circuitry transmits the target electric braking force calculated by the compensating circuitry to the power conversion apparatus controlling circuitry, and when the determining circuitry determines that compensation is necessary for the gap between the actual braking force and the target braking force, the target pressure calculating circuitry subtracts the actual electric braking force calculated by the compensating circuitry from the target braking force, and thereby calculates the target mechanical braking force indicating a target value of the mechanical brake force, and calculates the target pressure based on the target mechanical braking force.

18. The brake control system according to claim 12, wherein the determining circuitry determines that compensation is necessary for the gap between the actual braking force and the target braking force, in a case in which a status of the braking instruction containing the normal braking instruction accompanied by generation of an electric braking force changes to a status of the braking instruction containing the emergency braking instruction, when the determining circuitry determines that compensation is necessary for the gap between the actual braking force and the target braking force, the compensating circuitry gradually decreases the target electric braking force, and determines the actual electric braking force to be 0, when the determining circuitry determines that compensation is necessary for the gap between the actual braking force and the target braking force, the regenerative brake controlling circuitry transmits the target electric braking force calculated by the compensating circuitry to the power conversion apparatus controlling circuitry, and when the determining circuitry determines that compensation is necessary for the gap between the actual braking force and the target braking force, the target pressure calculating circuitry subtracts the actual electric braking force calculated by the compensating circuitry from the target braking force, and thereby calculates the target mechanical braking force indicating a target value of the mechanical brake force, and calculates the target pressure based on the target mechanical braking force.

19. A brake control system comprising:

target braking force calculating circuitry to calculate a target braking force for causing a railway vehicle to decelerate in accordance with a braking instruction containing a normal braking instruction or an emergency braking instruction, the normal braking instruction designating a normal deceleration indicating a target value of deceleration of the railway vehicle, the emergency braking instruction designating an emergency deceleration indicating a target value of deceleration of the railway vehicle greater than a maximum value of the normal deceleration;

target pressure calculating circuitry to calculate a target pressure based on the target braking force, the target pressure indicating a target value of pressure of fluid to be fed to a mechanical brake device in order to activate the mechanical brake device, the mechanical brake device being configured to press a friction member against a rotating body and thereby cause the railway vehicle to decelerate, the friction member being configured to move depending on a pressure of the fed fluid, the rotating body being configured to rotate during running of the railway vehicle;

an output valve to compress fluid fed from a fluid source in accordance with the target pressure and feed the compressed fluid to the mechanical brake device; and compensation controlling circuitry to execute control for compensating for a gap between an actual braking force and the target braking force when the braking instruction contains the emergency braking instruction, the actual braking force indicating an existing braking force generated in the railway vehicle, wherein the control for compensating for the gap is not executed when the braking instruction does not contain the emergency braking instruction, wherein the compensation controlling circuitry comprises determining circuitry to determine whether compensation is necessary for the gap between the actual braking force and the target braking force, and compensating circuitry to compensate for the gap between the actual braking force and the target braking force, when the determining circuitry determines that compensation is necessary for the gap between the actual braking force and the target braking force, the railway vehicle accelerates by receiving a driving force from a motor, the motor being configured to rotate in response to feeding of electric power fed from a power source and converted by a power conversion apparatus, and decelerates by receiving at least either of an electric braking force and a mechanical braking force generated by the mechanical brake device, the electric braking force being generated by consumption of electric power, the electric power fed from the motor functioning as an electric generator and converted by the power conversion apparatus, the brake control system further comprises regenerative brake controlling circuitry, the regenerative brake controlling circuitry being configured to calculate a target electric braking force indicating a target value of the electric braking force based on the target braking force, transmit the target electric braking force to power conversion apparatus controlling circuitry and thereby induce generation of the electric braking force, the power conversion apparatus controlling circuitry being configured to control the power conversion apparatus in accordance with the target electric braking force, and acquire, from the power conversion apparatus controlling circuitry, an actual electric braking force indicating an existing electric braking force, and the target pressure calculating circuitry subtracts the actual electric braking force from the target braking force, and thereby calculates a target mechanical braking force indicating a target value of the mechanical brake force, and calculates the target pressure based on the target mechanical braking force, and the compensating circuitry calculates a target electric braking force based on the target braking force, when the determining circuitry determines that compensation is necessary for the gap between the actual braking force and the target braking force, and determines the target electric braking force to be 0 regardless of the target braking force, when the determining circuitry determines that no compensation is necessary for the gap between the actual braking force and the target braking force, and when the braking instruction contains the emergency braking instruction, the regenerative brake controlling circuitry transmits the target electric braking force calculated by the compensating circuitry to the power conversion apparatus controlling circuitry.

20. A brake control method of controlling brake, the method comprising:

calculating a target braking force for causing a railway vehicle to decelerate in accordance with a braking instruction containing a normal braking instruction or an emergency braking instruction, the normal braking instruction designating a normal deceleration indicating a target value of deceleration of the railway vehicle, the emergency braking instruction designating an emergency deceleration indicating a target value of deceleration of the railway vehicle greater than a maximum value of the normal deceleration;

calculating a target pressure based on the target braking force, the target pressure indicating a target value of pressure of fluid inside a brake cylinder included in a mechanical brake device;

controlling the mechanical brake device in accordance with the target pressure; and executing control for compensating for a gap between an actual braking force and the target braking force by adjusting the target pressure while the emergency braking instruction is being input, the actual braking force indicating an existing braking force generated in the railway vehicle, wherein the control for compensating for the gap is not executed when the emergency braking instruction is not input.

* * * * *